United States Patent
Garrigues et al.

(10) Patent No.: US 9,037,600 B1
(45) Date of Patent: May 19, 2015

(54) ANY-IMAGE LABELING ENGINE

(75) Inventors: Pierre Garrigues, Berkeley, CA (US);
Charles Cadieu, San Francisco, CA (US); Benjamin Jackson Culpepper, Berkeley, CA (US); Killian Koepsell, San Francisco, CA (US); Huy X. Nguyen, Berkeley, CA (US); Andrew Stadlen, Mountain View, CA (US); Gerry Pesavento, Davis, CA (US); David Warland, Davis, CA (US)

(73) Assignee: Yahoo! Inc., Sunnyvale, CA (US)

( * ) Notice: Subject to any disclaimer, the term of this patent is extended or adjusted under 35 U.S.C. 154(b) by 444 days.

(21) Appl. No.: 13/016,776

(22) Filed: Jan. 28, 2011

(51) Int. Cl.
*G06F 7/00* (2006.01)
*G06F 17/30* (2006.01)

(52) U.S. Cl.
CPC ....... *G06F 17/30244* (2013.01); *Y10S 707/915* (2013.01)

(58) Field of Classification Search
CPC ............... G06F 17/30244; G06F 17/30864; G06F 17/30038; G06F 17/3005; G06F 17/20247; G06F 17/30265; G06F 17/30271; G06F 17/30994; G06F 17/30997; G06F 17/30017
USPC ................ 707/772, 769, 999.107, 915
See application file for complete search history.

(56) References Cited

U.S. PATENT DOCUMENTS

| | | | | |
|---|---|---|---|---|
| 5,309,526 A | * | 5/1994 | Pappas et al. | 382/237 |
| 5,496,270 A | * | 3/1996 | Nettekoven | 604/30 |
| 5,913,205 A | * | 6/1999 | Jain et al. | 1/1 |
| 6,421,690 B1 | | 7/2002 | Kirk | |
| 6,677,948 B1 | * | 1/2004 | Wasserman et al. | 345/428 |
| 7,113,918 B1 | | 9/2006 | Ahmad et al. | |
| 7,139,784 B2 | | 11/2006 | Knobe et al. | |
| 7,148,913 B2 | | 12/2006 | Keaton et al. | |
| 7,352,292 B2 | | 4/2008 | Alter et al. | |
| 7,509,353 B2 | | 3/2009 | Kelkar et al. | |
| 7,657,100 B2 | * | 2/2010 | Gokturk et al. | 382/209 |
| 7,675,461 B1 | | 3/2010 | McCusker et al. | |
| 7,854,509 B2 | | 12/2010 | Johns | |
| 7,961,117 B1 | | 6/2011 | Zimmerman et al. | |

(Continued)

FOREIGN PATENT DOCUMENTS

WO 2011/043982 4/2011

OTHER PUBLICATIONS

Cula et al, "Compact Representaion of Bidirectional Texture Functions". IEEE 2001.*

(Continued)

*Primary Examiner* — Daniel Kuddus
(74) *Attorney, Agent, or Firm* — Weaver Austin Villeneuve & Sampson LLP

(57) ABSTRACT

A system for tagging an image comprises a processor and a memory. The processor is configured to analyze an image associated with an image query using one or more computer vision analysis types to determine zero or more computer vision matches. Each computer vision match has one or more associated computer vision tags. In the event that it is determined that there are zero computer vision matches, the processor is further configured to analyze the image associated with the image query using a human vision analysis system to determine zero or more human vision matches. Each human vision match has one or more associated human vision tags. A memory coupled to the processor and configured to provide the processor with instructions.

24 Claims, 30 Drawing Sheets

(56) References Cited

U.S. PATENT DOCUMENTS

| | | | |
|---|---|---|---|
| 8,050,503 | B2 | 11/2011 | Dekel et al. |
| 8,134,614 | B2 | 3/2012 | Fujii |
| 8,134,624 | B2 | 3/2012 | Solhusvik et al. |
| 8,150,216 | B2* | 4/2012 | Retterath et al. ............... 382/305 |
| 8,173,818 | B2* | 5/2012 | Singh et al. ................ 546/273.7 |
| 8,214,309 | B1 | 7/2012 | Khosla et al. |
| 8,265,866 | B2 | 9/2012 | Altamura et al. |
| 8,478,052 | B1 | 7/2013 | Yee et al. |
| 2003/0048928 | A1 | 3/2003 | Yavitz |
| 2006/0107297 | A1 | 5/2006 | Toyama et al. |
| 2006/0274978 | A1 | 12/2006 | Fukuda et al. |
| 2007/0005571 | A1* | 1/2007 | Brewer et al. .................... 707/3 |
| 2007/0033531 | A1* | 2/2007 | Marsh ........................... 715/738 |
| 2007/0110338 | A1* | 5/2007 | Snavely et al. ............... 382/305 |
| 2007/0177805 | A1* | 8/2007 | Gallagher ..................... 382/190 |
| 2007/0274978 | A1 | 11/2007 | Danielson et al. |
| 2008/0080745 | A1* | 4/2008 | Vanhoucke et al. .......... 382/118 |
| 2008/0144943 | A1* | 6/2008 | Gokturk et al. ............... 382/224 |
| 2008/0152231 | A1 | 6/2008 | Goturk et al. |
| 2009/0034782 | A1 | 2/2009 | Gering |
| 2009/0153799 | A1 | 6/2009 | Johns |
| 2009/0257663 | A1 | 10/2009 | Luo et al. |
| 2010/0046842 | A1* | 2/2010 | Conwell ....................... 382/218 |
| 2010/0070483 | A1* | 3/2010 | Delgo et al. .................. 707/706 |
| 2010/0070523 | A1* | 3/2010 | Delgo et al. .................. 707/769 |
| 2010/0125605 | A1 | 5/2010 | Nair et al. |
| 2011/0064302 | A1 | 3/2011 | Ma et al. |
| 2011/0184972 | A1* | 7/2011 | Ard et al. ..................... 707/769 |
| 2011/0196859 | A1* | 8/2011 | Mei et al. ..................... 707/723 |
| 2011/0244919 | A1 | 10/2011 | Aller et al. |
| 2011/0264570 | A1 | 10/2011 | Houseworth et al. |
| 2011/0298932 | A1* | 12/2011 | Gorian et al. ................. 348/164 |
| 2012/0011119 | A1* | 1/2012 | Baheti et al. .................. 707/737 |
| 2012/0011142 | A1* | 1/2012 | Baheti et al. .................. 707/769 |
| 2012/0102050 | A1 | 4/2012 | Button et al. |
| 2012/0235988 | A1 | 9/2012 | Karafin et al. |

OTHER PUBLICATIONS

Christmas et al., "Structural Matching in Computer Vision Using Probabilistic Relaxation", IEEE 1995.*
Chakravarty et al. "Characteristic views as a basis for three-dimensional object recognition", SPIE vol. 336, 1982.*
U.S. Appl. No. 13/016,779, "Monitoring an any-image labeling engine," Garrigues et al., filed Jan. 28, 2011.
U.S. Appl. No. 13/016,779, Office Action mailed Jan. 16, 2013.
U.S. Appl. No. 13/016,779, Office Action mailed Aug. 8, 2013.
Fisher, Matthew et al., "Context-based search for 3D models," ACM Transactions of Graphics, vol. 29, No. 6, Article 182, Dec. 2010.
ACM Digital Library results: image tagging with computer vision match and user vision match, Jan. 12, 2013.
Cucchiara, R. et al., "Intelligent Distributed Surveillance Systems—Computer vision system for in-house video surveillance," IEE Proc.—Vis. Image Signal Process, vol. 152, No. 2, Apr. 2005.
Toyama, Kentaro et al., "Geographic location tags on digital images," ACM 1-58113-722-2/03/0011, Nov. 2003.
U.S. Appl. No. 13/016,779, Office Action mailed Aug. 28, 2014.

* cited by examiner

| Dashboard | Query Info | Image | Results |
|---|---|---|---|
| Queries | 11/30/2010<br>09:44:31 AM<br>(processing)<br>UID poison55 | | CVInst : X<br>Class : X<br>Human : X<br>Final : X |
| Tags | | | |
| Users | 11/30/2010<br>09:38:19 AM<br>time: 13s<br>UID raviteja | | CVInst : X<br>Class : X<br>Human : X<br>Final : blank |
| Taggers | | | |
| System | 11/30/2010<br>09:31:10 AM<br>time: 20s<br>UID oMoby2 | | CVInst : X<br>Class : X<br>Human : blurry<br>Final : blurry |
| CV Train | | | |
| | 11/30/2010<br>09:30:03 AM<br>time: 19s<br>UID jack | | CVInst : X<br>Class : animal<br>Human : moose<br>Final : moose |
| | 11/30/2010<br>09:28:57 AM<br>time: 15s<br>UID oMoby2 | | CVInst : X<br>Class : box<br>Human : cube<br>Final : cube |

| Dashboard | 1432 UID | 1434 Active? | 1436 #Queries |
|---|---|---|---|
| Queries | poison55 | Yes | 22 |
| Tags | | | |
| Users | raviteja | Yes | 15 |
| Taggers | | | |
| System | oMoby2 | Yes | 35 |
| CV Train | | | |
| | jack | Yes | 4 |
| | rocky | No | 22 |

| Dashboard | TID 1442 | Active? 1444 | #Tags 1446 |
|---|---|---|---|
| Queries | | | |
| Tags | margret | Yes | 222 |
| Users | dion | Yes | 42 |
| Taggers | | | |
| System | james | No | 4 |
| CV Train | | | |
| | billy | No | 2 |
| | lauren | No | 1004 |

Fig. 14E

ANY-IMAGE LABELING ENGINE

BACKGROUND OF THE INVENTION

One of the most revolutionary technologies of the Internet age has been the search engine. Internet users instantly have access to a wealth of information by typing a few words (e.g., keywords) relevant to the thing they are interested in. The success of the text-based search engine at providing a user with information in response to a text query, and the proliferation of mobile cameras, have created a demand for visual search, where a user provides an image and is seeking information in response. Here the user may not know the words to describe his image, or may find text entry inconvenient or impossible, and thus traditional text search is not useful to him. He may desire to know what the image is of or to find information about an object in the image, or where to get something like an object in the image (e.g., procure or purchase the object in the image), or what the name of a person in the image is, or he may want some information extracted from the image (e.g., the time on a clock, the code from a barcode, etc.). Image search has lagged text search because of the difficulties of computer vision processing. Recognizing images within a strict framework (e.g., reading the time off of a clock) is relatively easy, however, recognizing any object without restriction can be quite difficult.

BRIEF DESCRIPTION OF THE DRAWINGS

Various embodiments of the invention are disclosed in the following detailed description and the accompanying drawings.

FIG. 14B is a diagram illustrating an embodiment of a query monitoring screen for a dashboard system.

FIG. 14B is a diagram illustrating an embodiment of a query monitoring screen for a dashboard system.

FIG. 14C is a diagram illustrating an embodiment of a tag monitoring screen for a dashboard system.

FIG. 14D is a diagram illustrating an embodiment of a user management screen for a dashboard system.

FIG. 14E is a diagram illustrating an embodiment of a tagger management screen for a dashboard system.

DETAILED DESCRIPTION

Figure 1:
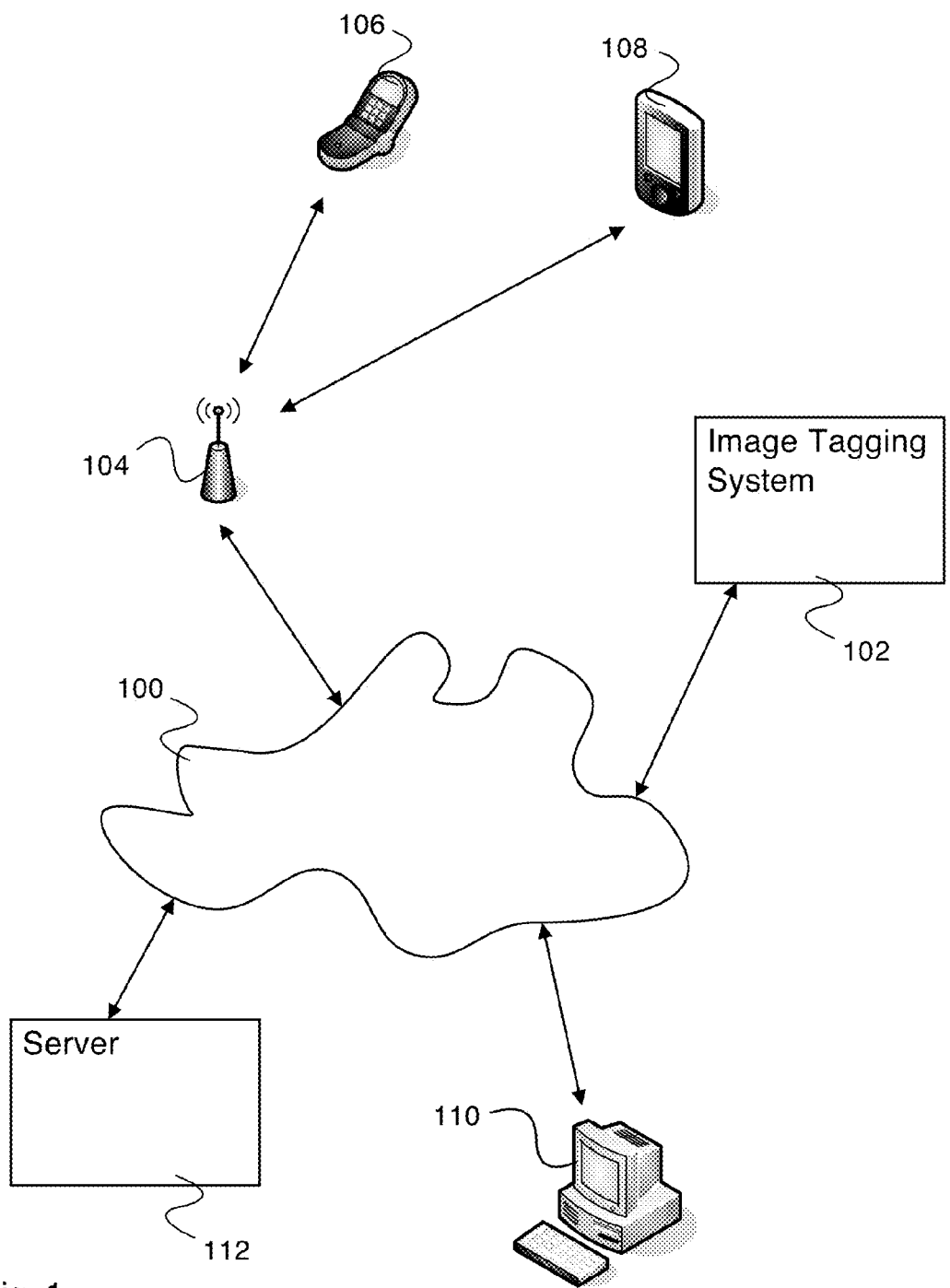
FIG. 1 is a block diagram illustrating an embodiment of a network system.

The invention can be implemented in numerous ways, including as a process; an apparatus; a system; a composition of matter; a computer program product embodied on a computer readable storage medium or server cluster; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

An any-image labeling engine is disclosed. The any-image labeling engine takes any image or video as input from a user and provides the user with a set of tags that describe the image or video content. In order to be able to process any image or video, the any-image labeling engine uses a hybrid approach, with a computer vision module in conjunction with a human computation module. The any-image labeling engine passes input images to one or more modules upon receipt. In the event that the computer vision module is able to identify the image and provide descriptive tags to the user, the any-image labeling engine is a success. The image is added to the computer vision database, if not already present, in order to broaden the spectrum of image searches the database is able to successfully respond to (e.g., the image is added to the computer vision database where the image represents a new view of a previously-existing object on the database). In the event that the computer vision module is not able to identify the image or in the event that the computer vision module is not able to provide as specific an answer as is desired, the any-image labeling engine waits for an answer from the human computation module. When the human computation module returns a set of tags for the image, the tags are provided to the user. Additionally, the image and tags are added to the computer vision database, in order that the next time a similar image is received, the computer vision database will be able to provide tags for the image query directly. The image recognition engine is able to learn (e.g., the recognition engine is able to get smarter and faster) with each visual query, both from computer vision and human results.

In some embodiments, the image recognition engine is able to programmatically monitor learned images and tags to identify those that have not been matched by subsequent queries; these objects can then be deleted or removed from the primary computer vision database to ensure that the database size does not increase to such an extent that query response speed suffers. In various embodiments, a computer vision match comprises one or more of the following: a classification match, an instance match, an exact match, a match based on a model of parts, or any other appropriate computer vision method. In various embodiments, tags comprise one or more of the following: a noun, an adjective, an adverb, a description of the image or a part of the image, or any other appropriate type of tag. In some embodiments, models are set up for search result items (e.g., top image tagged for the day)—for example, remote control or a new computer game related image are used for training a model to develop a new model for future image tagging.

In some embodiments, human and computer modules are used to generate tags which are fed to a results processor. In some embodiments, human feedback, or tags, are used to trigger the learning of the instance or classifier modules and databases.

In some embodiments, a human module is queried after a computer module makes a preliminary assessment—for example, the computer module identifies a tag for an image (e.g., a car) and the tag is not specific enough, or otherwise found to be inadequate (e.g., based on context information, so the image is provided to a specialist human tagger for more specific information (e.g., a Toyota Prius, a 1969 mustang convertible, etc.). In various embodiments, the context information comprises one or more of the following: information from an originating web site (e.g., car identifier, object identification for the blind, what is this flower?), information from an originating web service, associated text information (e.g., product information), a specific user request (e.g., what time does the clock say?, what is the tree name?), a specific request from a site submitting the image, or metadata information from a service (e.g., information about the submitting user, geolocation, etc.), or any other appropriate context information.

In some embodiments, a computer vision result provides a match with a probability of a computer vision match and the human vision is used to verify the computer vision match. For example, computer vision system or module indicates that there is a probability of the image having a sailboat, but it is not a strong match, and human vision is used to confirm it. In other words, there is not always 100% computer vision certainty and hints from computer vision are valuable because the computer vision module response is not completely adequate. The result is provided to the results processor and to a human tagger as additional information, even though not a certainty, and the resulting tags from human taggers and the original uncertain computer vision tags are analyzed using the results processor (e.g., by confirmation of human tagger provided tags).

The computer computation module comprises a set of one or more computer vision engines for automatically identifying objects and scenes in images and video received by an image tagging system. In various embodiments, the computer vision engines use an instance recognition module, a classification module, a 3D object recognition module, an optical character recognition module, a face detection, identification, or recognition module, a barcode recognition module, a color detection module, or any other appropriate module. The instance recognition module identifies objects in images using a set of features describing the shapes and textures that are specific to the object. The classification module represents a visual class as a composition of parts, which are then described by their shape and texture. These parts are allowed to move relative to one another to increase robustness to the typical variations in appearance of examples of a particular visual class. The optical character recognition module first detects whether there are characters in an image, and then identifies which letters or digits these characters correspond to. The spatial arrangement of the characters is used to form words and numbers. The face detection, identification, or recognition module detects, identifies, or recognizes a face within an image and extracts facial features (e.g. eyes, nose, chin, jaw line, ears, mouse, etc.), and the relative configuration of these features forms a signature that is then matched with a database containing the face signatures of other individuals and/or with a database of facial features. The barcode recognition module first detects 1-D and 2-D barcodes using coarse features that represent their distinctive shapes. Once the barcode is detected, then the embedded code is recognized using fine-grained analysis. If a code is of UPC or ISBN type, the product information is looked up in a database. The clock recognition module uses the classification module to identify a clock in an image. Once a clock is detected, then the module extracts features (e.g. needles, digits) within the clock that determine the time. The color detection module builds a histogram of the colors that appear in the image. It then uses this histogram to extract the most dominant colors, and describe them in a human or machine readable format (e.g. mostly blue, with some red).

In some embodiments, a user captures a frame of a movie and the system identifies a frame number of the movie that corresponds to the captured image. In various embodiments, movie information is identified from the image of the frame including one or more of the following: a title, a linked product, actors in the scene, a linked director's cut, additional footage, a web page, or any other appropriate information.

The human computation module comprises a computer module that provides a number of human taggers with an image (e.g., provides information so that the image is presented to a tagger on a computer display via a wired, wireless, and/or cellular connection) and receives a tag from the human taggers in response to the image presented (e.g., receives a tag from a user as input to a computer interface—for example, a text string as input from a keyboard, an audio snippet as input via a microphone, etc.—via a wired, wireless, and/or cellular connection). In some embodiments, the tags provided by a tagger to the human computation module for a particular image are stored until they are matched by tags received from one or more addition human tagger. In some embodiments, the tags provided by a tagger to the human computation module for a particular image are compared to the tag results provided by the computer computation module to increase the confidence level in the correctness of the computer vision computation module's response. When a tag has been confirmed it is then delivered from the human computation module back to the any-image labeling engine. Given a strong enough record of success, a human tagger may be determined by the human computation module to be reliable without confirmation, and have his tags delivered directly back from the human computation module to the any-image labeling engine. The human computation engine may itself contain multiple human analysis modules and sources of human image identification including websites, business process outsourcing firms, crowdsourcing networks, social network pages and gaming modules. Each human input can be statistically measured and monitored in terms of response.

The any-image labeling engine additionally comprises a dashboard system for monitoring the system status. The dashboard system is able to provide a system management platform and information to a system administrator on image queries, tags that have been applied to images, system users, image taggers, and system status, as well as allowing the administrator to train the computer vision module by adding images and tags at his discretion.

The garbage collection module comprises a set of one or more rules for identifying images that have been added to the computer vision database but which have not been matched against at least a predefined number of subsequent queries and during a defined period of time (e.g., one match in 3 years, 20 matches in one day, etc.). Both the minimum number of matches required and the time period in which they must occur are parameters that can be adjusted to optimize performance. In various embodiments, the garbage collection module deletes or archives the images that are identified by these parameters. In some embodiments, the garbage collection module moves the images that are identified by these parameters to a different database with lower quality of service characteristics than the primary computer vision database. In various embodiments, the garbage collection module is automated, whereas in others, it is executed manually, or in any other appropriate manner. In various embodiments, garbage collection of images includes images that have no features, not enough features, a blank image, an ambiguous image, an image with too many matches, or any other appropriate images. In some embodiments, the garbage collection module removes an object from a database. In some embodiments, the object is removed from an instance database, a model database, a classification database, a 3D database, a barcode database, an optical character database, a face database, a color database, or any other appropriate database.

In some embodiments, image objects and/or classes are associated with a geographic location (e.g., a global positioning location of a mobile phone) so that subsequent queries can use the data. So, for example, if I take a picture of object X at location X, we can do three things for subsequent query Y from location Y (within a small radius around location X):

Add the tags from query X to those in consideration for query Y. Thus, only one human (or a lower threshold value required) for these suggested tags is needed for confirmation.

Suggest the tags from query X to the taggers who receive query Y: "image tagger thinks this might be an X; do you agree?"

Suggest the tags from query X to the end user who submitted query Y: "image tagger thinks this might be an X; is this correct or would you like to continue the search?"

FIG. 1 is a block diagram illustrating an embodiment of a network system. The network system of FIG. 1 comprises image and video tagging system 102 communicating with network 100. Image tagging system 102 comprises an any-image labeling engine. In various embodiments, network 100 comprises one or more of the following: a local area network, a wide area network, a wired network, a wireless network, the Internet, or any other appropriate network. In the example shown, a user submits an image (or multiple images) to be tagged to image tagging system 102 via network 100. In some embodiments, the image to be tagged is created using a mobile device (e.g., camera enabled cellular telephone 106, PDA 108, or another mobile device, for instance a Wi-Fi enabled digital camera) and conveyed to network 100 via wireless access point 104. In some embodiments, the image to be tagged is located on a user's home computer (e.g., computer 110), either after it was uploaded by the user from a digital camera or other image creation device or downloaded from the Internet, and is submitted through a wired connection to network 100. In some embodiments, the image tagging system user comprises a web site or other computing system that uses image tagging as part of its service, and images are submitted from the user's system server (e.g., server 112) through network 100, to image tagging system 102. Image tagging system 102 receives and stores the image and submits the image to be processed. Image tagging system 102 generates one or more tags and provides the tags to the user. The amount of time to generate the tags varies from a few seconds or less if the computer vision engines successfully analyze the image to tens of seconds when the tags are provided by the human computation module. In various embodiments, image tagging system 102 comprises a computer system or server including one or more processors, one or more storage devices, one or more databases, and any other appropriate hardware and software systems for tagging the received image. In some embodiments, the image tagging processing can be located on the end user device (106, 108 or 110), where the local device serves both as visual query generation and processing.

Figure 2:
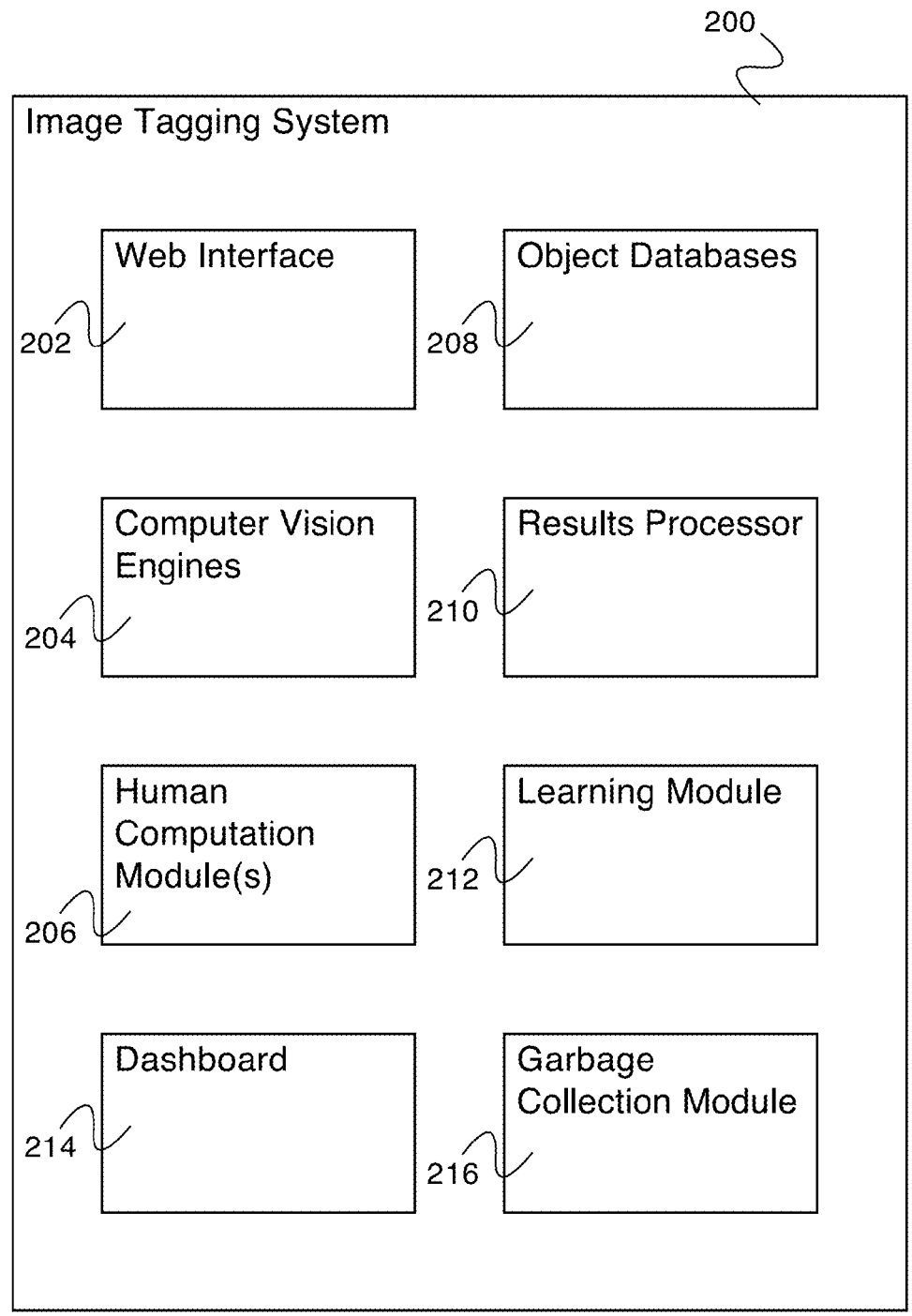
FIG. 2 is a block diagram illustrating an embodiment of an image tagging system.

FIG. 2 is a block diagram illustrating an embodiment of an image tagging system. In some embodiments, image tagging system 200 comprises image tagging system 102 of FIG. 1. In the example shown, image tagging system 200 comprises web interface 202, computer vision engines 204, human computation module(s) 206, object databases 208, results processor 210, learning module 212, and dashboard 214. Web interface 202 comprises an interface accessible through the internet for submitting images to image tagging system 200. In some embodiments, web interface 202 comprises a graphical user interface (GUI), enabling a user to easily submit images to image tagging system 202. In some embodiments, web interface 202 comprises an application programming interface (API), enabling a programmer to create software that submits images and other information to image tagging system 200 and receives tags from image tagging system 200. In some embodiments, web interface 202 uses a communication interface other than the internet (e.g., a local area network, a wide area network).

In the example shown, computer vision engines 204 comprises a set of one or more computer vision engines for automatically identifying objects in images or videos received by image tagging system 200. In various embodiments, the computer vision engines use an instance recognition module, a 3D recognition module, a classification module, an optical character recognition module, a face identification module, a barcode recognition module, a color detection module, or any other appropriate module. In some embodiments, each different module utilized by computer vision engines 204 is utilized by a separate computer vision engine. In some embodiments, computer vision engines 204 comprises more than one computer vision engine, and the separate computer vision engines execute their modules in parallel. In some embodiments, computer vision engines 204 utilize information stored in object databases 208 as part of executing computer vision modules. In some embodiments, an instance recognition module utilizes object databases 208 as its instance library. In some embodiments, a classification module utilizes object databases 208 as its class representation library.

In the example shown, human computation module(s) 206 comprises one or more human computation modules for image recognition. A human computation module for image recognition comprises one or more humans each capable of recognizing content in images and providing text tags for the images. In some embodiments, a human computation module relays any tags provided by its humans directly to results processor 210. In some embodiments, the human computation module additionally provides various processing functionality prior to providing the tags to results processor 210. In various embodiments, processing functionality includes determining a status of a human tagger, determining a validity of a tag based on a status of a human tagger, confirming a validity of a tag based on receipt from multiple human taggers, marking a tag with a validity status based on a status of a human tagger, or any other appropriate processing functionality. In some embodiments, human computation module(s) 206 comprises more than one human computation module. In various embodiments, human taggers are divided into separate rating categories or human computation modules based on specialty, historical tag quality, experience, age, location, average time to provide results, word quality, tagger status, or any other appropriate tagger classification. In some embodiments, a human vision match is performed by providing one or more human taggers with an image query and context information, where the human tagger provides one or more tags associated with the image query.

Results processor 210 comprises a results processor for receiving and processing tags from computer vision engines 204 and human computation module(s) 206. In the example shown, results processor 210 ranks the received tags according to a predetermined ranking algorithm and provides the highest ranked tag or tags to the image tagging system user (e.g., the user that originally provided the image). In various embodiments, the predetermined ranking algorithm utilizes a module ranking (e.g., tags received from a computer vision instance module rank more highly than tags received from a computer vision classification module), a module score (e.g., tags received from the same module are ranked based on a score assigned to them by the module they are received from), or any other appropriate ranking criteria.

In some embodiments, results are combined from multiple modules to create a compound tag. For example, a color module returns a tag "red" and a classification module returns a tag "car" with information that "red" and "car" originate from the same spatial location within the image and the results are combined to form a tag "red car". In some embodiments, union and intersection methods discussed with regard to human taggers are used with computer module tag results or a combination of human and computer vision tag results.

Learning module 212 comprises a module for updating object databases 208 based on the results of an image query. In some embodiments, if an instance recognition module or a classification module are able to determine tags for an image based on information stored in object databases 208 without finding an identical image stored in object databases 208, the learning module then stores the image in object databases 208 associated with the determined tags. In some embodiments, the learning module determines whether adding the image to object databases 208 will broaden the space of images associated with the determined tag. The learning module may then choose to store the image in object databases 208 if it broadens the space of images associated with the tag. In various embodiments, object databases 208 comprises one or more of the following: an instance image database, a class database, a model database, a 3D object database, an optical character database, a face database, a barcode database, and a color database, or any other appropriate database. In some embodiments, if computer vision engines 204 is not able to determine a tag associated with the image but human computation module(s) 206 is, learning module 212 stores the image and associated tag in object databases 208, so that the image can be automatically identified if it or a similar image is submitted in future queries. In some embodiments, learning module 212 processes an image before storing it and any associated tags in object databases 208. In some embodiments, 2D images of objects at different views are combined for efficient 3D representation of an object. In various embodiments, processing comprises background subtraction, object geometry processing, object class representation creation, or any other appropriate processing.

Dashboard 214 comprises an interface for an image tagging system administrator to manage visual queries and gain information about the current status of the image tagging system. In the example shown, the dashboard system provides information to a system administrator on image queries, tags that have been applied to images, system users, image taggers, and system status, as well as allowing the administrator to train the computer vision module by adding images and tags at his discretion.

Garbage collection module 216 comprises a module to clean out one or more of the databases (e.g., an instance database, a classification database, a model database) that determines whether an instance of an image or a class or a model are no longer relevant for the database. In some embodiments, an instance of an image is removed from the instance database in the event that the instance has not been accessed or returned a predetermined number of times in a predetermined period of time. In various embodiments, a class or a model are removed from the relevant database in the event that the class or model are no longer relevant for the database.

In some embodiments, modules or software of the image tagging system are executed using a processor. The processor is coupled to a memory configured to provide instructions to the processor. In various embodiments, the processor comprises one, two, three, or multiple processors.

Figure 3:
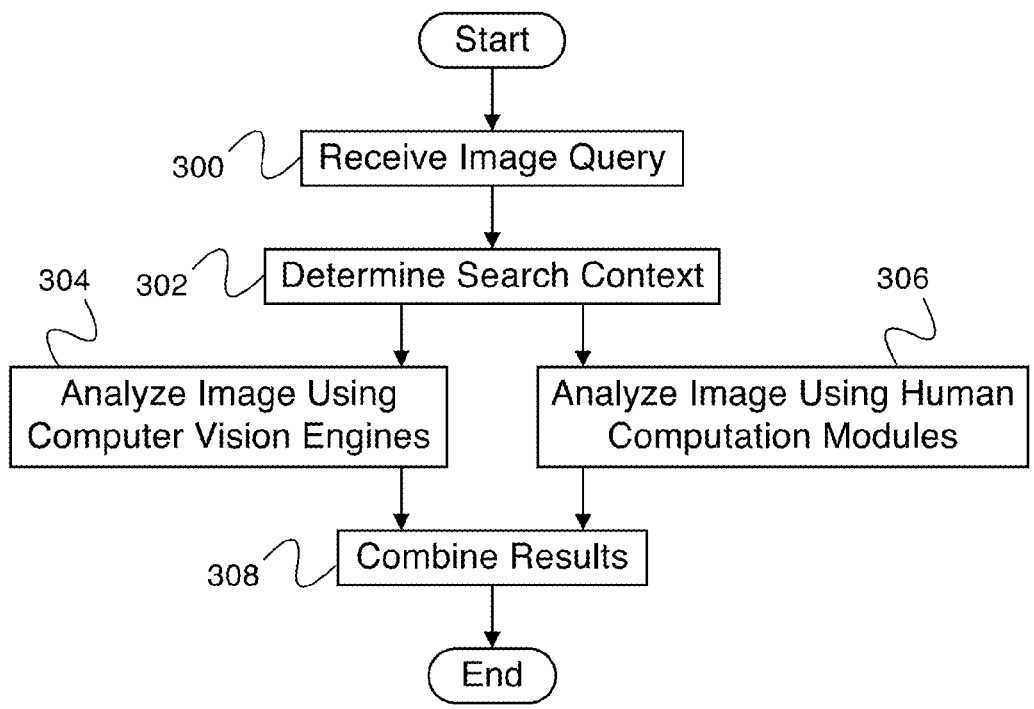
FIG. 3 is a flow diagram illustrating an embodiment of a process for image tagging.

FIG. 3 is a flow diagram illustrating an embodiment of a process for image tagging. In some embodiments, the process of FIG. 3 is executed by image tagging system 200 of FIG. 2. In the example shown, in 300, an image or video query is received. In various embodiments, the image query is received from a user using a mobile device (e.g., cellular telephone 106 of FIG. 1 or Tablet/PDA 108 of FIG. 1), a user on a desktop computer (e.g., computer 110 of FIG. 1), a server for a computing system that uses image tagging as part of its service (e.g., server 112 of FIG. 1), or any other appropriate image query user. In 302, the search context is determined. Determining the search context comprises determining additional user information in order to facilitate more accurate image tagging. In various embodiments, additional user information includes the user's age, user's social information, the user's location, the user's employer, the user's primary interest, or any other relevant user information. For instance, a user interested in purchasing Christmas presents might submit an image of a watch and be hoping to find places to buy that watch, while a user who is blind might submit an image of a watch wishing to know what time it is. An elementary school student might submit an image of a plant wishing to learn that it is a cactus, while a graduate student might submit the same image of a cactus wishing to know its exact species. In some embodiments, the additional user information comprises text information input by the user. In some embodiments, the additional user information comprises keywords added by a third party server (e.g., blind service, car identification site, calorie counter site, etc.) that provides context for the image interpretation and likely desired type of tagging result. In some embodiments, the location where the user is initiating the search will restrict the scope of objects that are searched by the computer vision engines. For instance, only the façades of nearby building are searched, or the products that are available in this particular location. In various embodiments, the query image is not sent to the computer vision engines and human computation modules in parallel, but to the computer vision engines only. Upon the results processor receiving the output from the computer vision engines, the search may be initiated in the human computation module (e.g. if the computer vision engines are not able to extract tags from the image).

Control then passes to 304 and 306 simultaneously, or to 304, and if no result or a partial or inadequate result is found (e.g., based on context information tag(s) are not sufficient to adequately respond to the image query), to 306. In 304, the image is analyzed using computer vision engines (e.g., computer vision engines 204 of FIG. 2). In 306, the image is analyzed using human computation modules (e.g., human computation module(s) 206 of FIG. 2). For example, the human computation module provides a suitable number of human taggers with an image and receives tags from the human taggers. In some embodiments, the tag(s) is/are evaluated and/or rated and provided to a results processor for combining. In various embodiments, ratings of taggers, unions of tags, intersections of tags, similarities of tags, are used to determine a set of zero or more tags to provide to a results processor. In 308, results received from the computer vision engines in 304 and from the human computation modules in 306 are combined. Image and video processing can be done with only computer vision, with a combination of computer and human vision, or with only human vision. In some embodiments, the results are combined using a results processor (e.g., results processor 210 of FIG. 2).

Figure 4A:
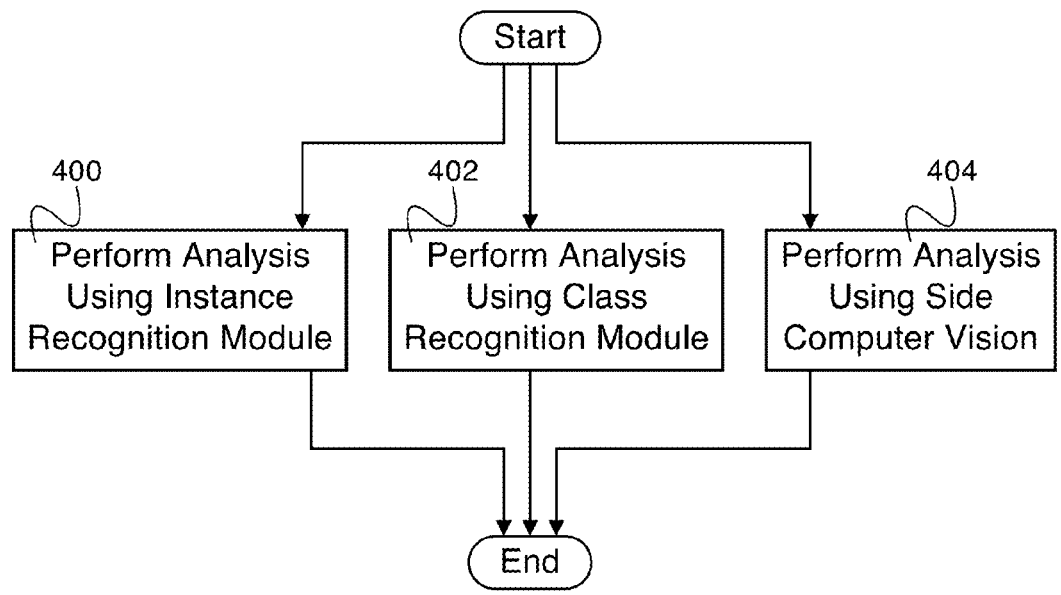
FIG. 4A is a flow diagram illustrating an embodiment of a process for analyzing an image using computer vision engines.

FIG. 4A is a flow diagram illustrating an embodiment of a process for analyzing an image using computer vision engines. In some embodiments, the process of FIG. 4A implements 304 of FIG. 3. In the example shown, 400, 402, and 404 are executed simultaneously. In 400, analysis is performed using the instance recognition module. In some embodiments, the instance recognition module comprises one of the engines of computer vision engines 204 of FIG. 2. In the example shown, the instance recognition module analyzes the image by comparing it with a stored library of images. If the image is found to be similar or identical to a stored image an associated set of tags (also stored in the library or database) of the stored image are provided to a results combiner or selector. In some embodiments, tags are stored associated with an image that are (1) not necessarily descriptive of the image, but rather, the desired result for a customer's application (e.g., a uniform resource locator (URL) to be returned when a particular image is queried) or (2) are confined to a certain user or API key and are not returned, even if the image is matched, for other Application Programming Interface (API) keys (e.g., a merchant product image is stored with keywords "Product ABC" but for the merchant API key only, also returns the metadata of "MERCHANT NAME barcode 123456789"). The one or more of the tags may be selected and provided in response to the image received by the system. In some embodiments, the instance recognition module is able to perform geometric transformations on the received image, in order to account for stored images that were photographed at a different angle from the image being analyzed. In some embodiments, instance recognition matches features or parametric models of the received image and the stored images. In some embodiments, the stored library of images is stored in an object database (e.g., an object database of object databases 208 of FIG. 2). In some embodiments, the object database combines 2D images of an object into a 3D object model.

In 402, analysis is performed using the class recognition module. In some embodiments, the class recognition module comprises one of the engines of computer vision engines 204 of FIG. 2. In the example shown, the class recognition module analyzes the image by comparing it with stored sets of images, each set representing a particular class of objects (e.g., trees, cars, fish, weddings, sunsets, adult content, etc.). The class recognition module is tuned to recognize images in a much more general way than the instance recognition module. The instance recognition module is only able to identify an image if there is an image in its database of the exact same thing (e.g., it is a blue 2008 Toyota Prius), but the class recognition module can recognize an image as being similar to a large set of other images even if there is no picture in the set of the exact same thing (e.g., it is a car). In some embodiments, the stored sets of images are stored in an object database (e.g., an object database of object databases 208 of FIG. 2). In the event that the class recognizer matches a class with a received image, an associated set of tags (e.g., car, 4 wheeled vehicle, etc. that are also stored in the class database) are provided to a results combiner or selector. The one or more of the tags may be selected and provided in response to the image received to a user or submitter of the image to the tagging system.

In 404, analysis is performed using side computer vision. In the example shown, side computer vision comprises other, more specialized computer vision modules. In some embodiments, side computer vision comprises one or more of the engines of computer vision engines 204 of FIG. 2. In various embodiments, side computer vision comprises one or more of the following computer vision modules: an optical character recognition module, a face identification module, a face recognition module, a face detection module, a 2D and 3D barcode recognition module, a clock recognition module, a color detection module, or any other appropriate computer analysis module.

Figure 4B:
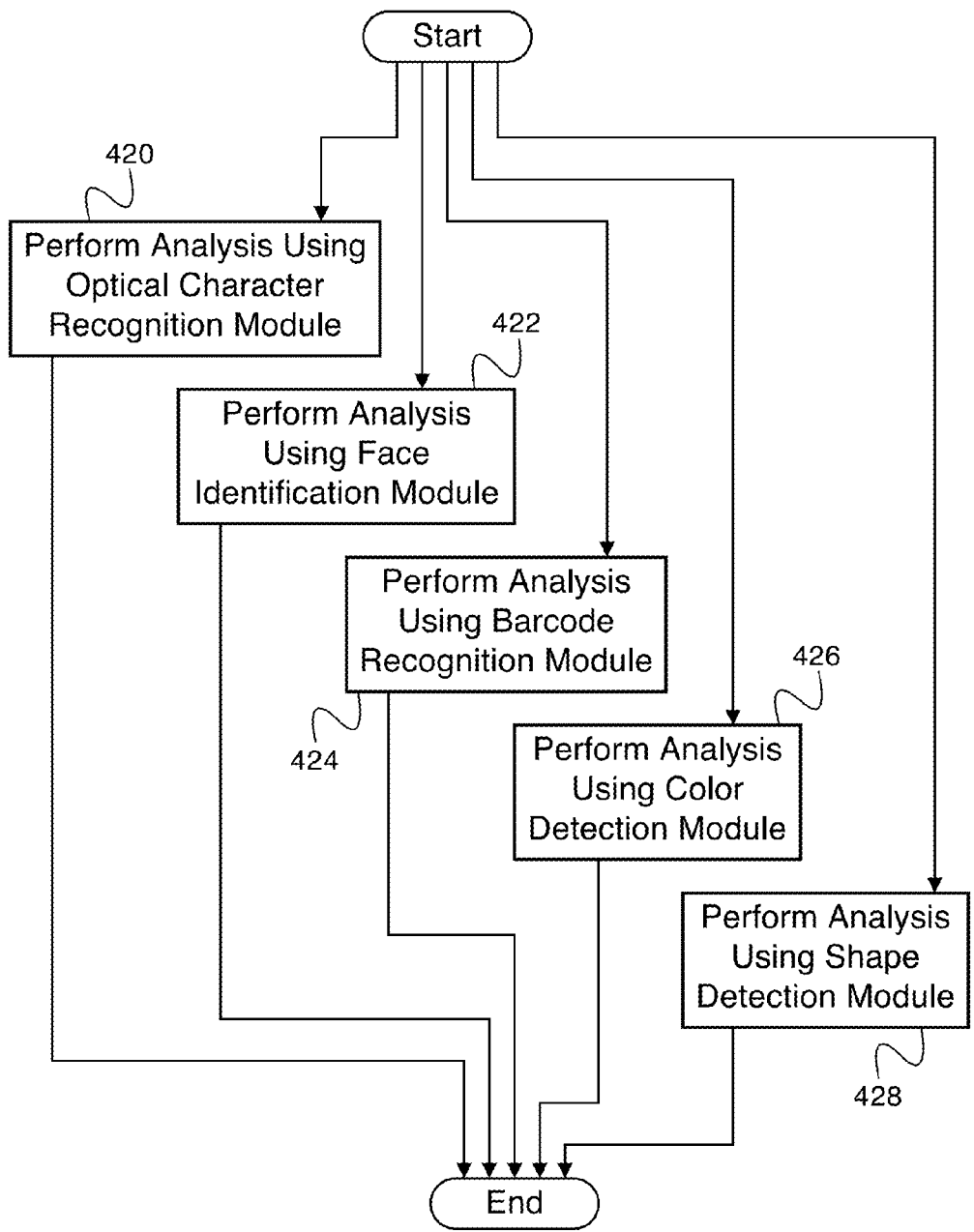
FIG. 4B is a flow diagram illustrating an embodiment of a process for performing analysis using side computer vision.

FIG. 4B is a flow diagram illustrating an embodiment of a process for performing analysis using side computer vision. In some embodiments, the process of FIG. 4B implements 404 of FIG. 4A. In the example shown, 420, 422, 424, 426, and 428 are executed simultaneously. In 420, analysis is performed using an optical character recognition module. In some embodiments, an optical character recognition module recognizes written text in an image and converts it to a digital representation of the text. In 422, analysis is performed using a face identification module. In some embodiments, a face identification module attempts to identify a portion of the image under analysis as a face. In some embodiments, the face identification, face recognition, or face detection module compares an image portion identified as a face with images stored in a face library to identify the person whose face appears in the image under analysis and/or a database of facial features to identify a model of the face in a library. In 424, analysis is performed using a barcode recognition module. In some embodiments, a barcode recognition module recognizes a barcode in an image and converts it to a digital representation of the code indicated by the barcode. The barcode recognition module first detects 1-D and 2-D barcodes, including QR Codes® (e.g., a proprietary 2-dimensional or matrix barcode), using coarse features that represent their distinctive shapes. Once the barcode is detected, then the embedded code is recognized using fine-grained analysis. In 426, analysis is performed using a color detection module. In some embodiments, a color detection module identifies the predominant color in an image. In some embodiments, a color detection module identifies all colors present in an image. For example, the color detection module builds a histogram of the colors that appear in the image. It then uses this histogram to extract the most dominant colors, and describe them in a human or machine readable format (e.g. mostly blue, with some red, 192873, etc.). In 428, analysis is performed using a shape detection module. For example, the shape detection module automatically segments objects of interests that can be used to prompt the computer vision modules or human taggers to tag the objects specifically or individually.

Figure 5:
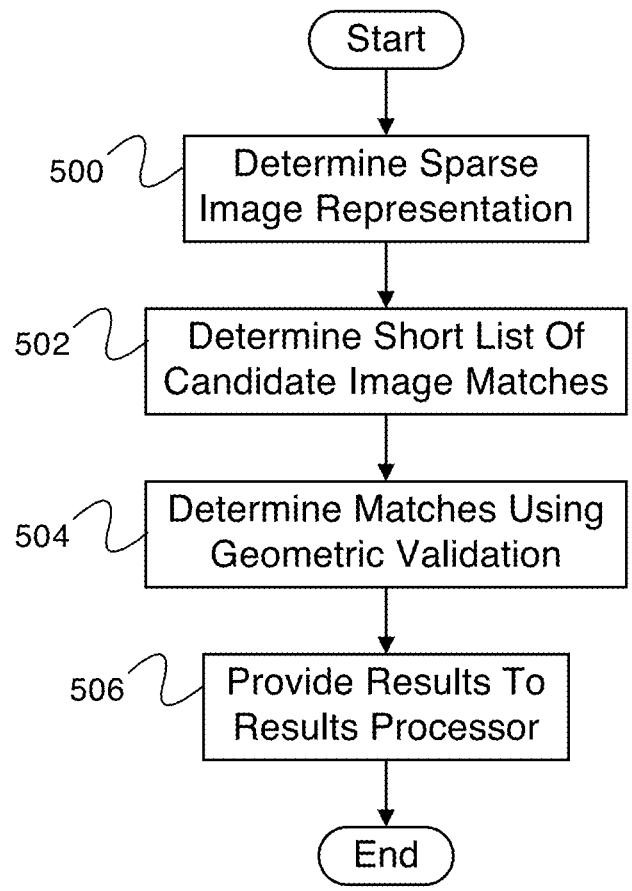
FIG. 5 is a flow diagram illustrating an embodiment of a process for performing image recognition using an instance recognition module.

FIG. 5 is a flow diagram illustrating an embodiment of a process for performing image recognition using an instance recognition module. In some embodiments, the process of FIG. 5 implements 400 of FIG. 4. In the example shown, in 500, a sparse image representation is determined. In some embodiments, a sparse image representation comprises an encoded image representation as a feature vector that has few active components. The sparse image representation makes the features that are salient in the images more explicit, and the representation has better interpretability. The sparse image representation is designed such that similar images have similar sparse image representations. For example, a sparse image representation comprises a list of sample points or key points and their accompanying descriptors that can be compressed or quantized to one or more granularities. In 502, a short list of candidate image matches is determined. In some embodiments, the short list of candidate image matches is determined by comparing the sparse image representation of the image under analysis with the sparse image representation of each of the images in the library and selecting the images from the library that match the image under analysis most closely. In 504, matches are determined using geometric validation. In some embodiments, matches are determined by geometric validation by performing a geometric validation comparison between the image under analysis and each image in the short list. The geometric validation comparison compares the two images and determines if there is a geometric transformation that maps one image to the other. If a transformation is found to map one image to the other the images are considered to be of the same object, and tags associated with the image for the database apply to the image under analysis. In 506, results are provided to the results processor (e.g., results processor 210 of FIG. 2). Results provided to the results processor comprise the set of tags associated with images determined in 504 to be of the same object as the image under analysis. In some embodiments, the location of the detected object within the image (e.g., the bounding box) or other appearance information (e.g., the specific geometric transformation used to match the object) is also provided to the results processor.

In some embodiments, a feature and/or a descriptor is a representation of visual space at a point in an image. In some embodiments, features and/or descriptors are concatenated to form a hyperfeature.

Figure 6:
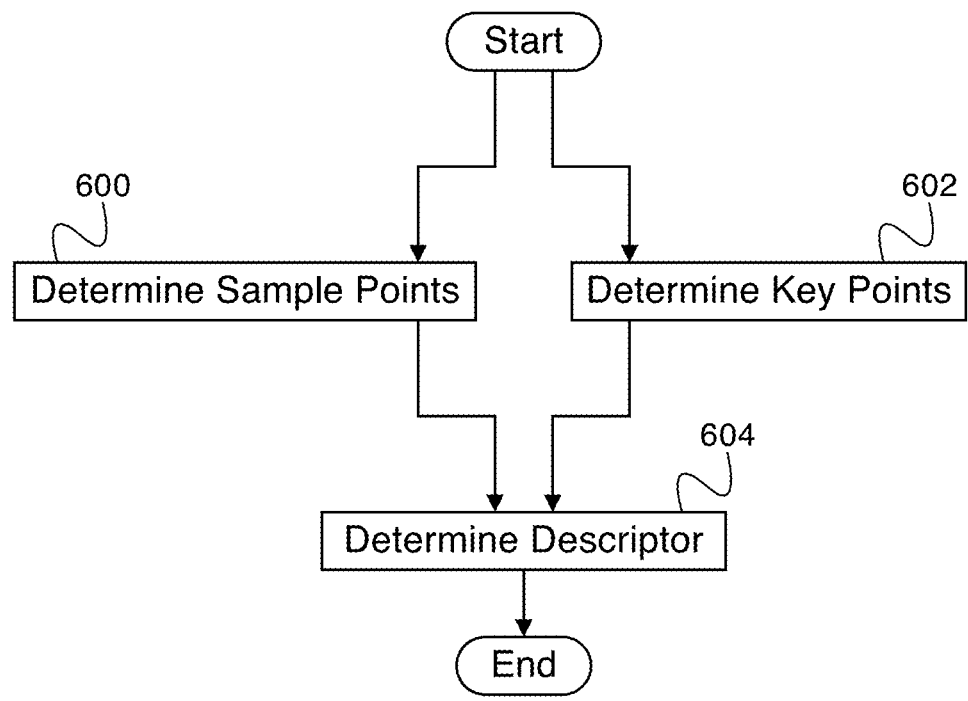
FIG. 6 is a flow diagram illustrating an embodiment of a process for determining a sparse image representation.

FIG. 6 is a flow diagram illustrating an embodiment of a process for determining a sparse image representation. In some embodiments, the process of FIG. 6 implements 500 of FIG. 5. In the example shown, 600 and 602 are executed simultaneously. In 600, sample points are determined. Sample points are taken at random locations in the image and with random scales. In 602, key points are determined. The key points are locations in the image that are determined by the image content, such as a particular corner in the image, or are centered around a region whose contrast or texture stays relatively constant. Key points can be reliably identified under image transformations such as rotation, scaling, change in perspective, or addition or noise. Sample points and key points are both 3-tuples of the form (x, y, scale) that specify a location in the image, and low-pass filtering plus down-sampling factor. Sample points are independent of the image content, and can occupy a regular lattice with fixed spacing, or be drawn at random. Key points are highly dependent on the image content and are the result of a highly optimized search that maximizes a saliency or stability criteria. In 604 a descriptor is determined. A descriptor characterizes a local image region in terms of a spatial arrangement of histograms of signed or unsigned oriented energy and color, centered at a sample point or key point, subtending an area of the image specified by the scale of the point, and possibly oriented relative to the dominant orientation in the specified region. In some embodiments, a descriptor comprises a histogram of oriented graded energy in a local region around a key point.

Figure 7:
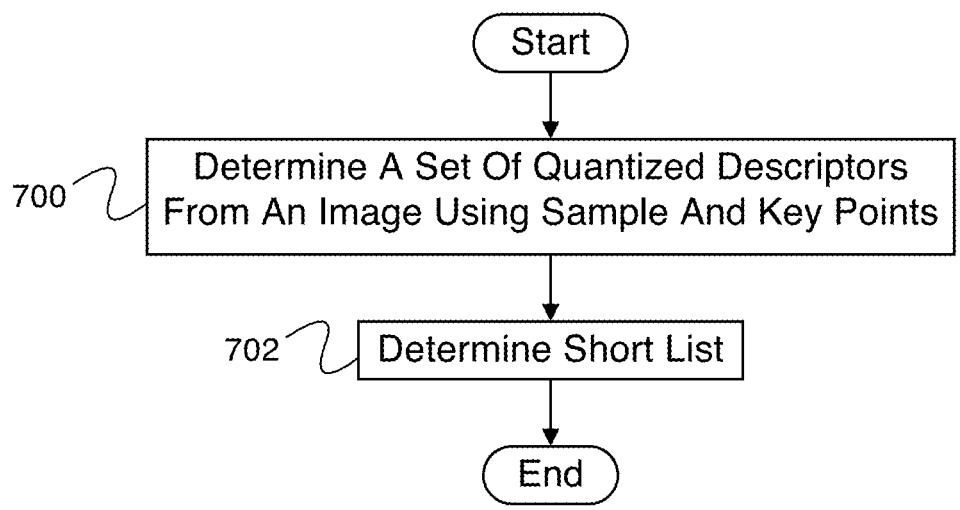
FIG. 7 is a flow diagram illustrating a process for determining a short list of candidate image matches.

FIG. 7 is a flow diagram illustrating a process for determining a short list of candidate image matches. In some embodiments, the process of FIG. 7 implements 502 of FIG. 5. In the example shown, in 700, a set of quantized descriptors is determined from an image using sample and key points. In some embodiments, a quantized descriptor comprises a code word that refers to a Voronoi cell in the space of all possible descriptors. Each descriptor determined in 604 is assigned to its closest quantized feature. In 702, a short list is determined. In some embodiments, a short list is determined from the union of images produced by performing an inverted table lookup on each quantized descriptor. In some embodiments, the inverted table is a mapping of each quantized descriptor to all images that contain it. In some embodiments, the inverted table is updated dynamically as new images become known without interrupting the operation of the system. The inverted table is built using all the images in the database that are indexed with their quantized descriptor. The rows of the table are the quantized features and the columns are the indexes of the image where the quantized feature appears, along with a quantized feature score that is determined by the quantized feature's selectivity. In some embodiments, the algorithm that is used to compute the quantized features is hierarchical, and each intermediate node in the tree used to determine the quantized feature has an entry in the inverted table. Building the inverted table can take up to an hour with several millions of images. Hence, when adding new images to an existing inverted table, we use an "on-line" algorithm that takes less than a second (without this online algorithm the inverted table would have to be recomputed from scratch). In some embodiments, a feature comprises a local description of the image around a point—for example, a series of numbers describing a texture, an orientation, a color, a curve, a structure, a scale, or any other appropriate basis for describing a local area of the image.

In some embodiments, an image has a number of features and each feature of a given image is added as leaf node to a feature node by quantizing the feature. Each feature node, representing a feature type, in the inverted table has an associated weight based on how informative that feature type is. The more informative the feature type, the greater its contribution to the match. Various metrics are used for the weighting of the feature type—for example, entropic weighting where commonly occurring feature types have lower weights because they are not distinctive. The weight associated with a feature type in the inverted table is a function of all the image feature types that are currently indexed and are stored in a separate weight table. The on-line algorithm maintains a set of parameters that allows it to incrementally update the weight table as new images (each with its own set of features) are added to the database. In various embodiments, the separate weight table is stored in memory and/or in a parameter database. Without this online algorithm, the computation of the weights would be too slow for real-time learning as the inverted table would have to be recomputed from scratch using the entire dataset of feature weights. In some embodiments, a short list of candidate image matches is determined by comparing the quantized descriptor with quantized descriptors for images stored in the database. The set of images whose quantized descriptor is closest (e.g., least mean squared error, 11 norm, chi-squared distance, etc.) to that of the image under analysis is selected as the short list of candidate image matches. In some embodiments, the N images sharing the largest sets of quantized descriptors with the image under analysis are selected as the short list of candidate image matches, where N is a predetermined desirable short list length. In some embodiments, all images are selected that share at least M quantized descriptors with the image under analysis, where M is a predetermined threshold.

Figure 8:
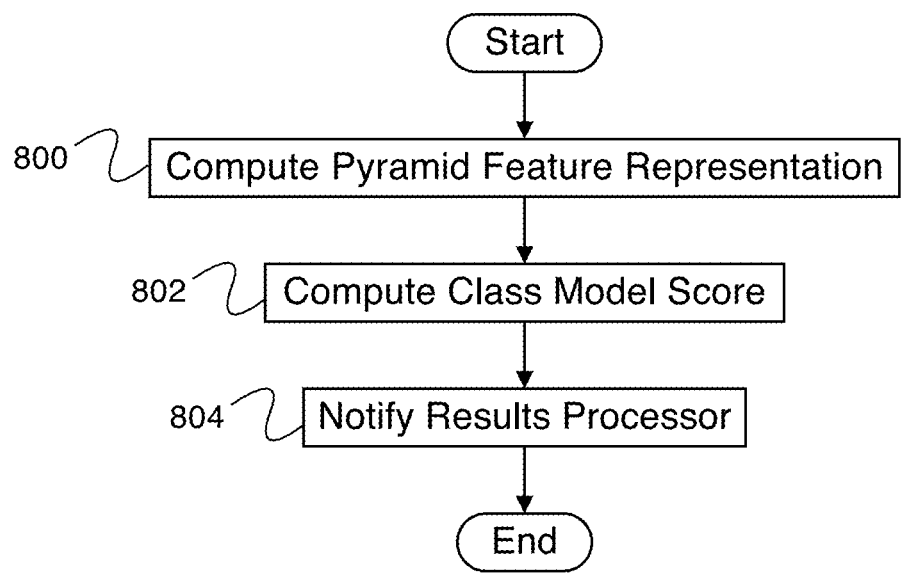
FIG. 8 is a flow diagram illustrating a process for performing image recognition using a class recognition module.

FIG. 8 is a flow diagram illustrating a process for performing image recognition using a class recognition module. In some embodiments, the process of FIG. 8 implements 402 of FIG. 4. In some embodiments, the process of FIG. 8 determines if an object present in the image under analysis is a member of a particular object class, and is repeated for each object class that the image recognition system contains data for. In the example shown, in 800, a pyramid feature representation is computed. In some embodiments, computing a pyramid feature representation comprises computing sample points and descriptors such as an image representation using histograms of oriented energy to describe the shapes that are present in the image. This process is repeated using several scaled versions of the image (e.g., a pyramid) such that objects can be detected at different scales. In 802, a class model score is computed. In some embodiments, computing a class model score comprises selecting the peak model score of a group of model scores gathered by computing the model score at each position and scale using the pyramid feature representation computed in 800. In some embodiments, the model score is not computed at certain locations where it has been determined that the object of the image under analysis is unlikely to be present. It is decided that the object under analysis is a part of the object class being investigated if the class model score is above a predetermined threshold. In some embodiments, the threshold can be different for each object class.

Figure 9A:
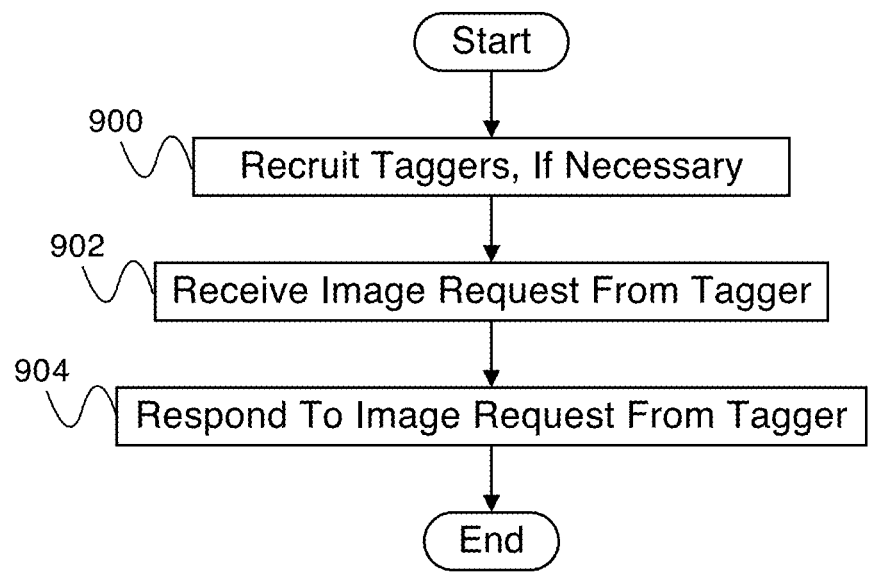
FIG. 9A is a flow diagram illustrating an embodiment of a process for maintaining a human computation module.

FIG. 9A is a flow diagram illustrating an embodiment of a process for maintaining a human computation module. In some embodiments, the process of FIG. 9 is used to maintain a group of humans as part of a human computation module. In some embodiments, the human computation module comprises a human computation module of human computation module(s) 206 of FIG. 2. In the example shown, in 900, taggers are recruited, if necessary. For example, taggers are hired to tag (e.g., paid per tag, per accepted tag, or per hour, etc.) or taggers participate as part of an image game, as part of a social mobile application, as part of a test, or are volunteers. Taggers are humans who are capable of providing descriptive tags for images. Tags are descriptive words describing the key content within the image. In some embodiments, a human computation module comprises a group of taggers in conjunction with human computation module software. In various embodiments, human computation module software comprises software for coordinating the group of taggers, for providing taggers with images to tag, for receiving tags for images, for processing image tags, or for any other appropriate human computation module software function. A certain level of tagger performance is necessary for proper functioning of the human computation module. In various embodiments, if tagger performance is below the desired level of tagger performance or if not enough taggers are present to satisfy the volume of tasks, more taggers are recruited. In 902, the human computation module software receives an image request from a tagger. In some embodiments, the image request indicates that the tagger is ready to provide image tags and desires an image to provide tags for. In 904, the human computation module software responds to the image request from the tagger. In some embodiments, responding to the image request from the tagger comprises having the system provide an image to the tagger along with any appropriate context information and wait to receive image tags from the tagger.

Figure 9B:
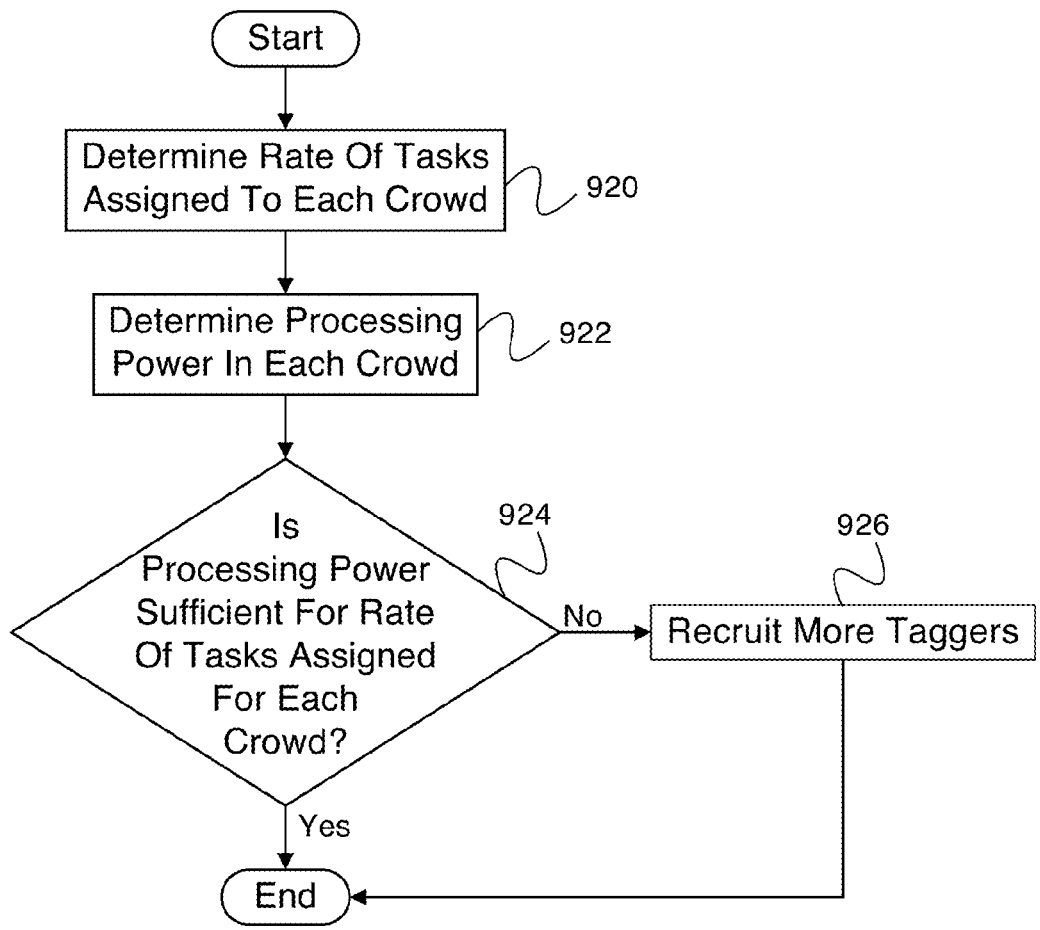
FIG. 9B is a flow diagram illustrating an embodiment of a process for recruiting taggers, if necessary.

FIG. 9B is a flow diagram illustrating an embodiment of a process for recruiting taggers, if necessary. In some embodiments, the process of FIG. 9B implements 900 of FIG. 9A. In the example shown, in 920, the rate of tasks assigned to each crowd is determined. In some embodiments, a crowd comprises a subgroup of taggers with a common theme, e.g., mushroom experts, motorcycle enthusiasts, taggers interested in applications for the blind, etc. In 922, the processing power in each crowd is determined. In some embodiments, the processing power of a crowd comprises a measurement of the rate at which it can process images. In some embodiments, the processing power comprises the sum of the image processing rate of each tagger in the crowd. In 924, it is determined whether the processing power is sufficient for the rate of tasks assigned for each crowd. In some embodiments, it is determined whether the processing power is sufficient for the rate of tasks assigned for each crowd by comparing the rate of tasks assigned to a crowd determined in 920 with the processing rate determined in 924. For each crowd, if it is determined that the processing power is not sufficient for the rate of tasks assigned, control passes to 926. In 926, more taggers are recruited. In various embodiments, taggers are recruited by instant messaging or other on-line or other notification of idle taggers in order to prompt them to log in and begin tagging images, by automated creation of new crowdsourcing (e.g. Amazon Mechanical Turk) Human Intelligence Tasks, by text message or email, by aural and visual notifications within the tagging website that they are needed, or by any other appropriate means for recruiting more taggers to begin tagging images. If it is determined in 924 that the processing power is sufficient for the rate of tasks assigned to the crowd, the process ends.

Figure 9C:
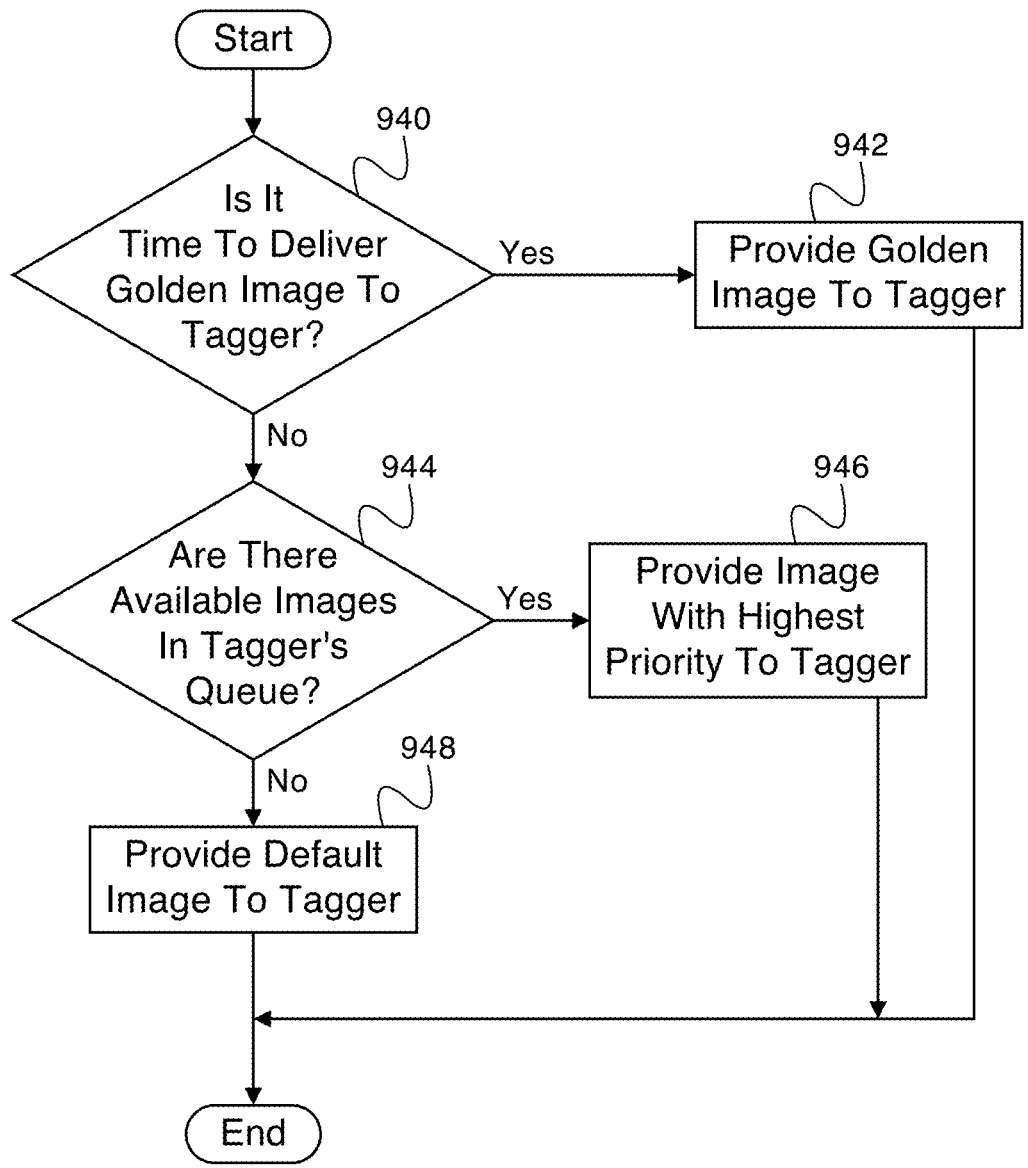
FIG. 9C is a flow diagram illustrating an embodiment of a process for responding to an image request from a tagger.

FIG. 9C is a flow diagram illustrating an embodiment of a process for responding to an image request from a tagger. In some embodiments, the process of FIG. 9C implements 904 of FIG. 9A. In the example shown, in 940 it is determined whether it is time to deliver a golden image to the tagger. In some embodiments, periodically a golden image is delivered to a tagger rather than an unknown image submitted by an image tagging system user. A golden image comprises an image for which the complete set of correct tags is known to the system, and is used to check the accuracy of the tagger. Metrics for tagger quality measurement include tag accuracy in responding to golden images, tag accuracy compared to other taggers, number of words used to describe an image, repetition of words, word density, word spelling and appropriateness, tagging speed, number of times image tag is passed when not identified, number of collusions of the same tag with another tagger, density of adjectives and nouns used, language analysis and other accuracy and speed metrics. In some embodiments, metrics for taggers are measured for all tags provided by taggers including tags for images other than golden images. If it is determined in 940 that it is time to deliver a golden image to the tagger, control passes to 942. In 942, a golden image is provided to the tagger, and the process ends. If it is determined in 940 that it is not time to deliver a golden image to the tagger, control passes to 944. In 944, it is determined whether there are available images in the tagger's queue. In some embodiments, when images are submitted to the image tagging system, some or all of the images appear in the image tagger's queue. In various embodiments, images submitted to the image tagging system do not appear in a given image tagger's queue because they are tagged by a computer vision module and have been removed from the queue, because they are tagged by one or more other human taggers and have been removed from the queue, because they are directed to a tagger with different expertise, or for any other appropriate reason. If it is determined in 944 that there are available images in the tagger's queue, control passes to 946. In 946, the image in the tagger's queue with the highest priority is provided to the tagger, and the process ends. If it is determined in 944 that there are no available images in the tagger's queue, control passes to 948. In 948, a default image is provided to the tagger. In various embodiments, a default image comprises a golden image, an image with no tags, a random image, a predetermined default image, or any other appropriate default image. Each image-task has a series of boolean conditions called 'qualifiers' attached to its internal-id. When a tagger performs an image request, the human computation module first verifies that each qualifier attached to the pending image-task is TRUE for the given tagger before sending back the image. The type and number of qualifiers attached to any given image-task can vary throughout the lifetime of the image-task within the system. Qualifiers may be verified by various means, the only condition is that a qualifier returns TRUE if the condition is met and FALSE when the condition is not. Examples of qualifiers: 'does this tagger have status 4?', 'does the image have a tag already?', and 'has the tagger tagged this image before?'.

Figure 9D:
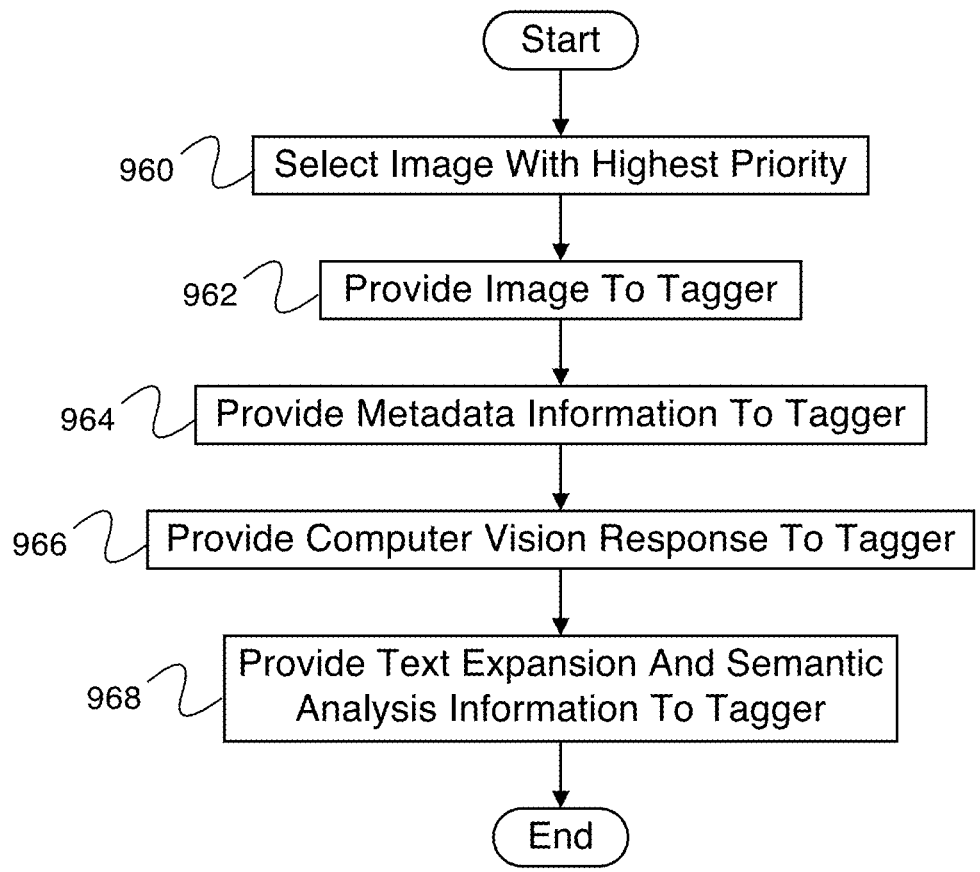
FIG. 9D is a flow diagram comprising a process for providing a tagger with the highest priority image from a queue.

FIG. 9D is a flow diagram comprising a process for providing a tagger with the highest priority image from a queue. In some embodiments, the process of FIG. 9D implements 946 of FIG. 9C. In the example shown, in 960, the image with highest priority is selected from the queue. In various embodiments, the image with the highest priority comprises the image at the top of the queue, the image at the bottom of the queue, the image that has been in the queue the longest, the image submitted by the user with the highest priority, or any other appropriate image. In 962, the image is provided to the tagger. In 964, any associated metadata information is provided to the tagger. In 966, the computer vision response (e.g., the response provided by computer vision engines 204 of FIG. 2) is provided to the tagger. In some embodiments, there is no computer vision response. In some embodiments, the computer vision response includes a color pool module response that is provided to the tagger For example, a visually impaired user may seek information about the color of his shirt. In some embodiments, the computer vision response includes the shape pool response that is provided to the tagger. In some embodiments, shape pool response automatically segments objects of interests and prompts the tagger to tag these objects specifically. In various embodiments, the computer vision response comprises one or more of an instance recognition module, a class recognition module, an optical character recognition module, a face detection, identification, or recognition module, a barcode recognition module, or any other appropriate module. In 968, the text expansion and semantic analysis information is provided to the tagger. For example, in some embodiments it useful to provide a higher level word root such as "dog" instead of the original tag "Labrador"

Figure 10A:
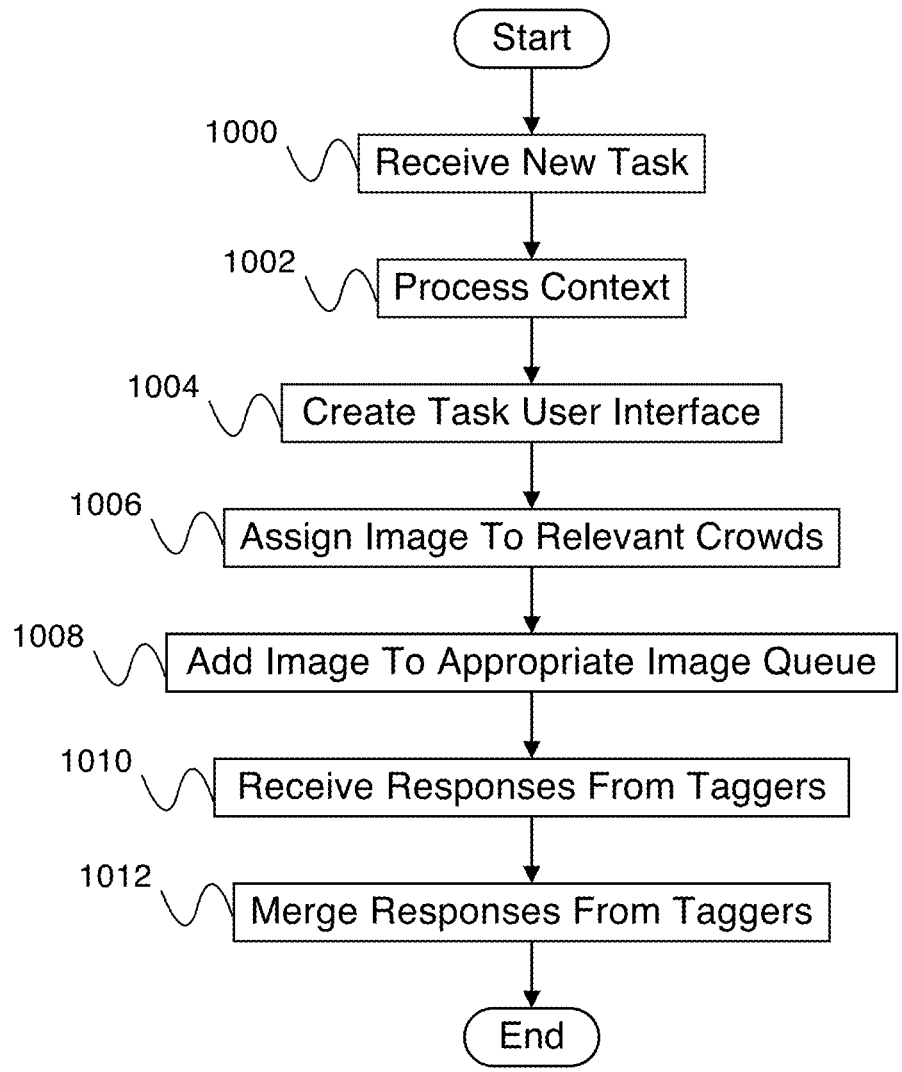
FIG. 10A is a flow diagram illustrating an embodiment of a process for analyzing an image using human computation modules.

FIG. 10A is a flow diagram illustrating an embodiment of a process for analyzing an image using human computation modules. In some embodiments, the process of FIG. 10A implements 306 of FIG. 3. In the example shown, in 1000, a new task is received. In some embodiments, a new task comprises a new image query to be tagged. In 1002, the task context is processed. In some embodiments, processing the task context comprises determining the system user that submitted the query and the existing results from other modules in response to the query. In some embodiments, existing results from other modules in response to the query comprise results returned by the computer vision engines (e.g., computer vision engines 204 of FIG. 2). In 1004, a task user interface is created. In some embodiments, the task user interface is created using task context information determined in 1002. In some embodiments, the default task user interface comprises the query image, a tagging guideline (e.g., "Describe the main object in 2-4 words"), and an image tag entry box. In various embodiments, the user interface can be modified by changing the tagging guideline (e.g., by making it more specific in the presence of additional information, for example "What kind of a car is this?"), by changing the structure of the image tag entry box (e.g., by making it more specific in the presence of additional information, for example if it is known that the image query contains a car, the image tag entry box changes to individual boxes for year, make, and model), an image tag game, or in any other appropriate way. In 1006, the image query is assigned to relevant crowds. In some embodiments, the relevant crowds are determined using context information determined in 1002. In some embodiments, context information is used to determine crowds (e.g., specialized groups of taggers) that have a specialty relevant to the query. In 1008, the image is added to the appropriate image queue. In some embodiments, the image is added to more than one appropriate image queue. The image is added to the image queue for each crowd determined in 1006 to have a relevance to the image query. Once an image has been added to a crowd's image queue, the system waits for an image request by a tagger (e.g., an image request received in 902 of FIG. 9). In some embodiments, the image is delivered to the tagger as part of the response to the image request (e.g., the image is delivered to the tagger in 946 of FIG. 9C when it is the highest priority image in the tagger's image queue). In 1010, responses to the image query are received from taggers. In 1012, responses from the taggers are merged.

Figure 10B:
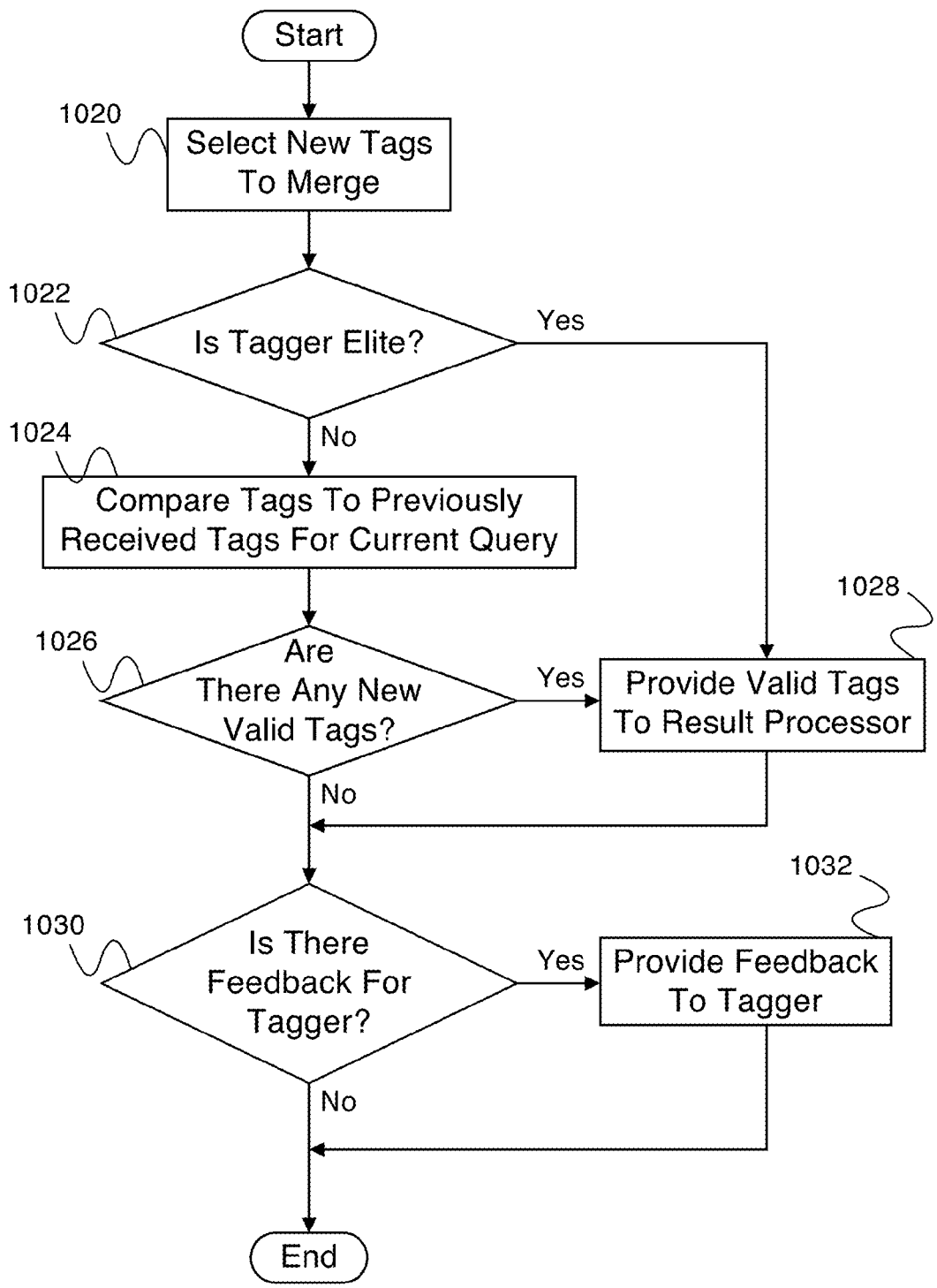
FIG. 10B is a flow diagram illustrating an embodiment of a process for merging responses from taggers.

FIG. 10B is a flow diagram illustrating an embodiment of a process for merging responses from taggers. In some embodiments, the process of FIG. 10B implements 1012 of FIG. 10A. In the example shown, in 1020, a new set of image tags is selected to merge with the tags already received. In various embodiments, selecting the new set of image tags additionally comprises determining the tagger that submitted the image tags, determining the time that the tags were submitted, or determining any other appropriate related information. In 1022, it is determined whether the tagger has elite status. In some embodiments, elite status designates that the tagger can be trusted without confirming the tags with tags from another tagger. If it is determined in 1022 that the tagger has elite status, control passes to 1028. In 1028, the tags, now determined to be valid, are provided to the results processor (e.g., results processor 210 of FIG. 2). Control then passes to 1030. If it is determined in 1022 that the tagger does not have elite status, control passes from 1022 to 1024. In 1024, the selected tags are compared to previously received tags for the current query. In 1026 it is determined whether there are any new valid tags. In some embodiments, it is determined whether there are any new valid tags by comparing the selected tags with the previously received tags for the current query. In some embodiments, if there is a match between any of the selected tags and any of the previously received tags, (e.g., a particular tag was submitted twice) the matching tag is determined to be valid. In some embodiments, if there is a match between the any of the selected tags and any of the previously received tags, all tags for the current query submitted by the taggers that submitted the matching tags are determined to be valid. In some embodiments, spell checking is performed on the tags before comparisons are made. In various embodiments, tags from the same root (e.g., "run" and "running") are considered to match, tags from the same predefined word family (e.g., "dog" and "Labrador") are considered to match, or tags with any other appropriate correspondence are considered to match. In 1028, the tags determined to be valid are provided to the results processor. Control then passes to 1030. If it is determined in 1026 that there is no match between any of the selected tags and any of the previously received tags, control passes directly to 1030. In 1030, it is determined if there is feedback for the tagger. In various embodiments, there is feedback for the tagger as a result of the tag aggregation algorithm (e.g., tag aggregation performed in 1026), in response to tags submitted for a golden image, or in response to the tags submitted for any other appropriate reason. If there is feedback for the tagger, control passes to 1032. In 1032, feedback is provided to the tagger, and the process ends. If it is determined in 1030 that there is no feedback for the tagger, the process ends.

Figure 10C:
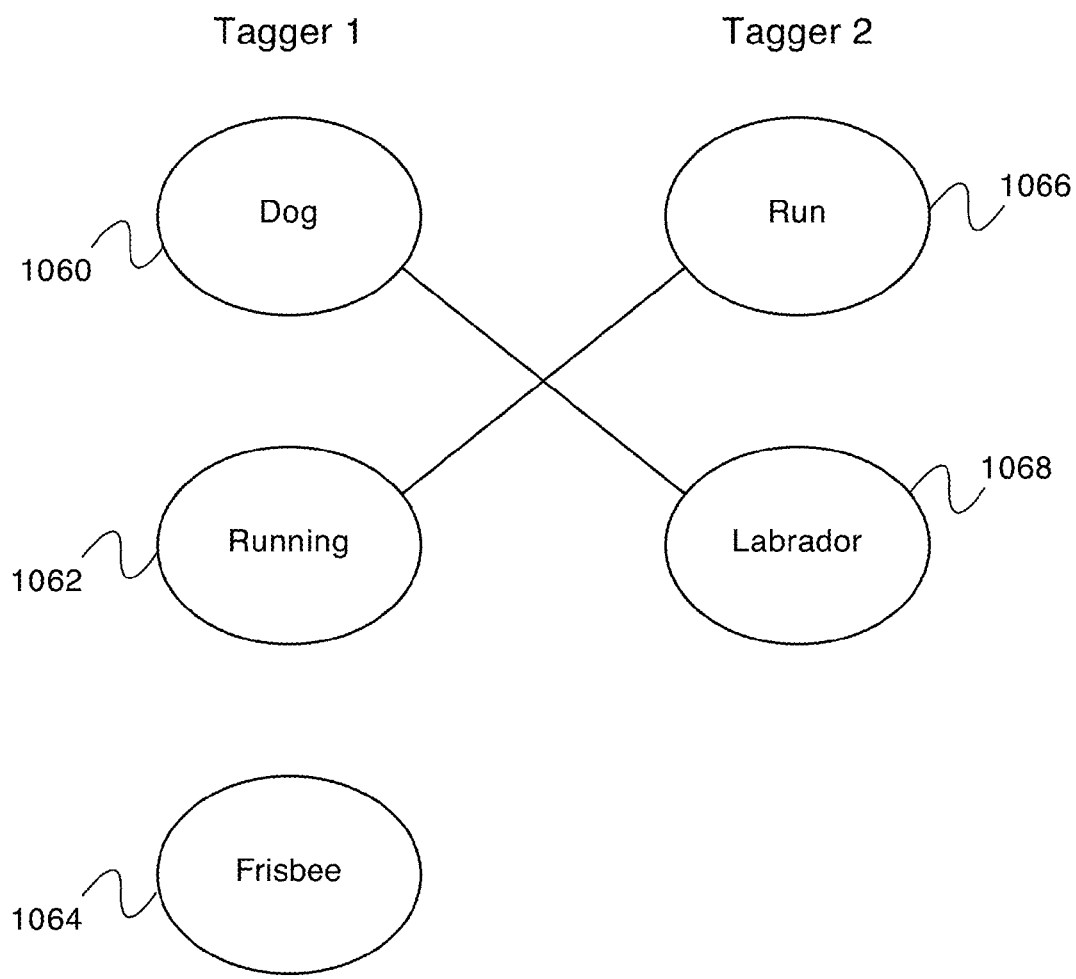
FIG. 10C is a diagram illustrating an embodiment of tag correspondences.

FIG. 10C is a diagram illustrating an embodiment of tag correspondences. In some embodiments, tag correspondences are used to determine the validity of tags (e.g., in 1026 of FIG. 10B). In the example shown, Tagger 1 submitted tag 1060, tag 1062, and tag 1064. Tagger 2 submitted tag 1066 and tag 1068. Each tagger is assigned a tagger status. In some embodiments, tagger status comprises one of the following: spam status, default status, good status, elite status. If a tagger has been assigned spam status, his tags are discarded without evaluation, as previous tags have demonstrated them to be so unreliable as to be useless. If a tagger has been assigned elite status, his tags are accepted as valid and passed on to the results processor (e.g., results processor 210 of FIG. 2) without evaluation, as previous tags have demonstrated them to be reliable on every occasion. If a tagger has been assigned default or good status, tag correspondences are used to determine tag validity. In the example shown, tags submitted by tagger 1 have been received in the past, and tags submitted by tagger 2 are being evaluated. Correspondences are found between tag 1060, comprising the word "dog" and tag 1068, comprising the word "Labrador", as well as between tag 1062, comprising the word "running" and tag 1066, comprising the word "run". Each tag found to have a correspondence with another tag is determined to be valid. If a tagger has been assigned default status, only his tags that have correspondences are determined to be valid. If tagger 1 has default status, his tag 1064, comprising the word "Frisbee", will be discarded, since it has no correspondence with another tag. If a tagger has been assigned good status, all tags that he submits for a given query will be determined to be good if any of them have a correspondence with another tag. If tagger 1 has good status, his tag 1064 will be determined to be good, since other tags that he submitted for the query were found to have correspondences.

Figure 11:
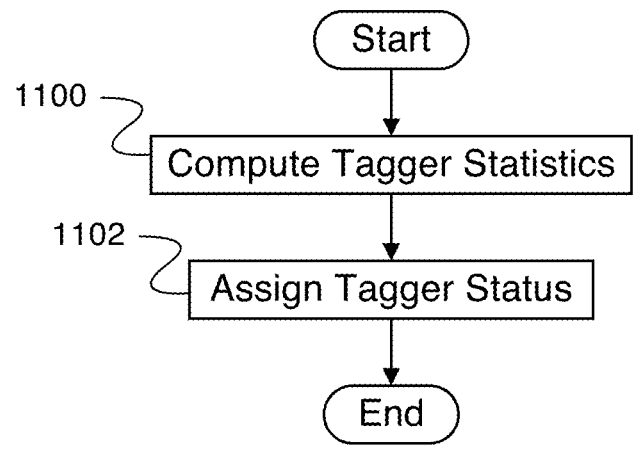
FIG. 11 is a flow diagram illustrating an embodiment of a process for assigning a tagger status.

FIG. 11 is a flow diagram illustrating an embodiment of a process for assigning a tagger status. In some embodiments, a tagger status is used in part to determine the validity of tags submitted by a tagger (e.g., when examining tag correspondences as in FIG. 10C). In the example shown, in 1100, tagger statistics are computed. In various embodiments, tagger statistics comprise the fraction of times that a tagger has correctly tagged a golden image, the fraction of times that tags submitted by a tagger have been validated by another tagger, the entropy of a tagger's tag vocabulary, or any other appropriate tagger statistics. In 1102, the tagger status is assigned. In some embodiments, an automated algorithm is used to assign the tagger status using the tagger statistics computed in 1100. In some embodiments, a manual process is used to assign the tagger status using the tagger statistics computed in 1100. In some embodiments, tagger status comprises one of the following: spam status, default status, good status, elite status. In various embodiments, good status is assigned after a tagger has tagged a number (e.g. ten) golden images correctly, after a tagger has tagged more images (e.g. twenty) golden images with at least a percent success rate (e.g. 80%), after a tagger's tags have been validated a number of times (e.g. three), after a tagger has submitted tags in response to a set query and success rate (e.g. thirty queries, 75 percent success rate,) or after any other appropriate tagger statistics. In various embodiments, elite status is assigned after a tagger has tagged a number (e.g. twenty two) golden images correctly, after a tagger has tagged at least an amount correctly (e.g. thirty golden images with at least a 95 percent success rate), after a tagger's tags have been validated a number of times (e.g. fifteen times), after a tagger has submitted tags in response to e.g. at least forty queries with a 90 percent success rate, or after any other appropriate tagger statistics. In various embodiments, spam status is assigned after a tagger has tagged an amount (e.g. eight) golden images incorrectly, after a tagger has tagged at least an amount (e.g. thirteen) of golden images with less than a percent (e.g. 30%) success rate, after a tagger's tags have been invalidated a number of times (e.g. six), after a tagger has submitted tags in response to at least a number (e.g. eighteen) queries with less than a percent (e.g. 25%) success rate, or after any other appropriate tagger statistics.

Figure 12:
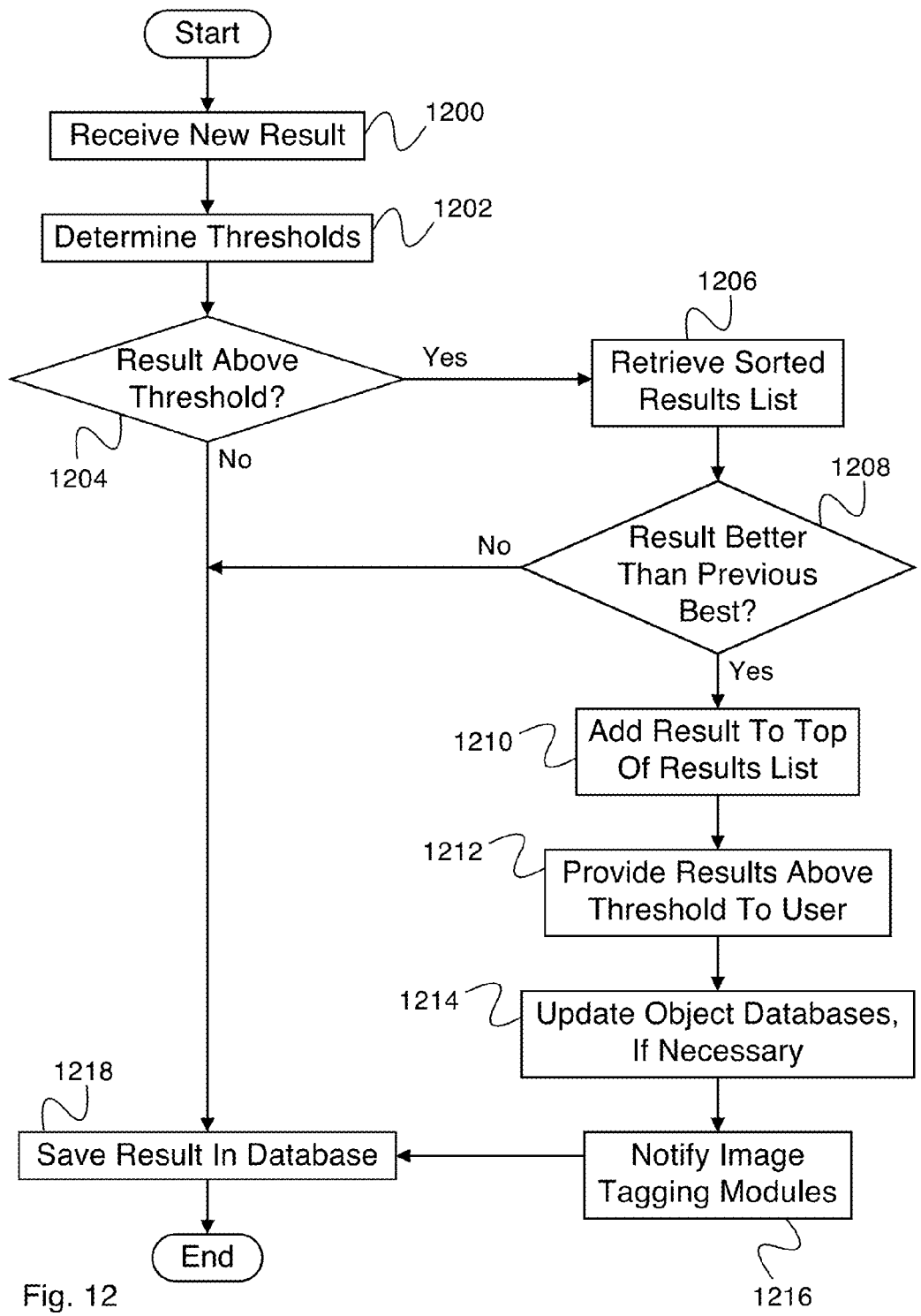
FIG. 12 is a flow diagram illustrating an embodiment of a process for combining results.

FIG. 12 is a flow diagram illustrating an embodiment of a process for combining results. In some embodiments, the process of FIG. 12 implements 308 of FIG. 3. In some embodiments, the process of FIG. 12 is executed by a results processor (e.g., results processor 210 of FIG. 2). In the example shown, in 1200, a new result is received. In various embodiments, the new result is received from a computer vision module (e.g., computer vision engines 204 of FIG. 2), from a human computation module (e.g., a human computation module of human computation module(s) 206 of FIG. 2), or by any other appropriate module. In 1202, thresholds are determined. In some embodiments, thresholds comprise the image tagging modules whose results are considered valid in conjunction with a minimum module score for validity. In various embodiments, there are a predetermined set of thresholds for all users, users are broken into groups according to an automated algorithm and thresholds are assigned by group, users are allowed to indicate their level of image specificity requirements and thresholds are assigned according to the users' choices, thresholds are determined based on the number or quality of responses to the image query, thresholds are determined based on whether the query is a common or uncommon query, or thresholds are determined for the query by any other appropriate means. In 1204, it is determined whether the current query result is above the threshold determined in 1202. In some embodiments, determining whether the current query result is above the threshold determined in 1202 comprises comparing the module providing the query result with the valid modules determined in 1202 and comparing the module score with the minimum module score determined in 1202. If the current query result is not above the threshold, control passes to 1218. In 1218, the current query result is saved in the database, and the process ends. In some embodiments, when the current query result is saved in the database, it is added to the sorted results list for the current query, in its appropriate place. If the current query result is determined to be above the threshold in 1204, control passes to 1206.

In 1206, the sorted results list for the current query is retrieved. In some embodiments, the results list is sorted by result score. In some embodiments, sorting the results list by result score comprises sorting the results by the module that provided the result. In some embodiments, in the event that multiple results were provided by the same module, sorting the results list by module score comprises sorting multiple responses provided by the same module by module score. In some embodiments, modules are ordered by level of specificity, with most specific ranking the highest. In some embodiments, a human computation module comprising experts in a particular area is considered to be the most specific. In some embodiments, the computation modules are ordered, from most to least specific, human expert, barcode recognition (e.g., barcode recognition module performing analysis in 424 of FIG. 4B), computer vision instance recognition (e.g., instance recognition module performing analysis in 400 of FIG. 4A), computer vision class recognition (e.g., class recognition module performing analysis in 402 of FIG. 4A), a generic human computation module, a color detection module (e.g., color detection module performing analysis in 426 of FIG. 4B). In 1208, it is determined whether the result is better than the previous best result. If the current query result is not better than the previous best result, control passes to 1218. In 1218, the current query result is saved in the database, and the process ends. In some embodiments, when the current query result is saved in the database, it is added to the sorted results list for the current query, in its appropriate place. If the current query result is determined to be better than the previous best result in the 1208, control passes to 1210.

In 1210, the current query result is added to the top of the results list. In 1212, the set of results that have been determined in 1204 to be above the threshold are provided to the user. In 1214, the object databases (e.g., object databases 208 of FIG. 2) are updated, if necessary. In some embodiments, the object databases are updated by a learning module (e.g., learning module 212 of FIG. 2). In some embodiments, the current query result is provided to the learning module. In some embodiments, the current image query is provided to the learning module. In some embodiments, the learning module updates object databases with information related to the current image query and result. In 1216, image tagging modules are notified. In some embodiments, image tagging modules are notified with the module and/or score associated with the current query result. In some embodiments, image tagging modules terminate execution upon notification of a query result. In some embodiments, image tagging modules terminate execution upon notification of a query result from a more highly ranking module. In 1218, the current query result is saved in the database, and the process ends. In some embodiments, the updated results list with the new query at the top is saved in the database.

Figure 13A:
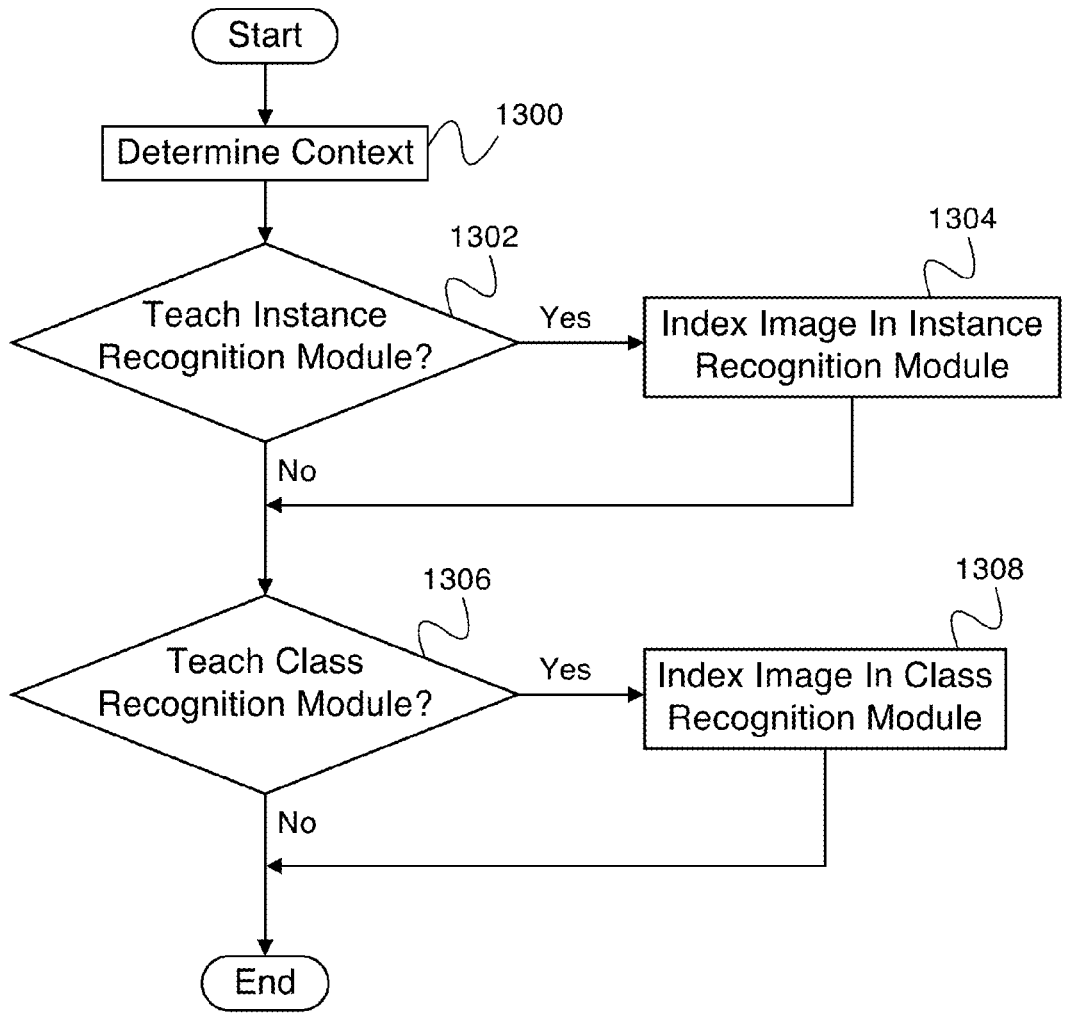
FIG. 13A is a flow diagram illustrating an embodiment of a process for updating object databases, if necessary.

FIG. 13A is a flow diagram illustrating an embodiment of a process for updating object databases, if necessary. In some embodiments, object databases (e.g., object databases 208 of FIG. 2) are updated, if necessary, by a learning module (e.g., learning module 210 of FIG. 2). In some embodiments, the process of FIG. 13A implements 1214 of FIG. 12. In the example shown, in 1300, context is determined. In some embodiments, determining the context comprises determining the system user and all module responses associated with the query. In 1302, it is determined whether to teach the instance recognition module. In various embodiments, the instance recognition module is taught if the queried image is not present in the object databases, if there is a comparable image in the object databases and the image presents a new view of the object, if the new view can be used to build a 3D object model, if the image tag is not present in the object database, if the image tag is not associated with the queried image in the object database, or for any other appropriate reason. If it is determined in 1302 that the instance recognition module should be taught, control passes to 1304. In 1304, the image is indexed in the instance recognition module. In some embodiments, indexing the image in the instance recognition module comprises storing it in the object database, either as a new object, or as a new image corresponding to an already existing object. In some embodiments, indexing the image in the instance recognition module comprises storing it in the object database associated with any appropriate tags. Control then passes to 1306. If it is determined in 1302 that the instance recognition module should not be taught, control passes directly to 1306.

In 1306, it is determined whether to teach the class recognition module. In various embodiments, the class recognition module is taught if the queried image is not present in the object database, if the appropriate class is not present in the class database, if the queried image is not associated with an appropriate class in the class database, if the image presents a new exemplar of a class present in the class database, or for any other appropriate reason. If it is determined in 1306 that the class recognition module should be taught, control passes to 1308. In 1308, the image is indexed in the class recognition module. In some embodiments, indexing the image in the class recognition module comprises storing it in the object database. In some embodiments, storing the image in the class recognition module comprises creating a new class in the class database and storing the image in the object database associated with that class. The process then ends. If it is determined in 1306 that the class recognition module should not be taught, the process ends.

Figure 13B:
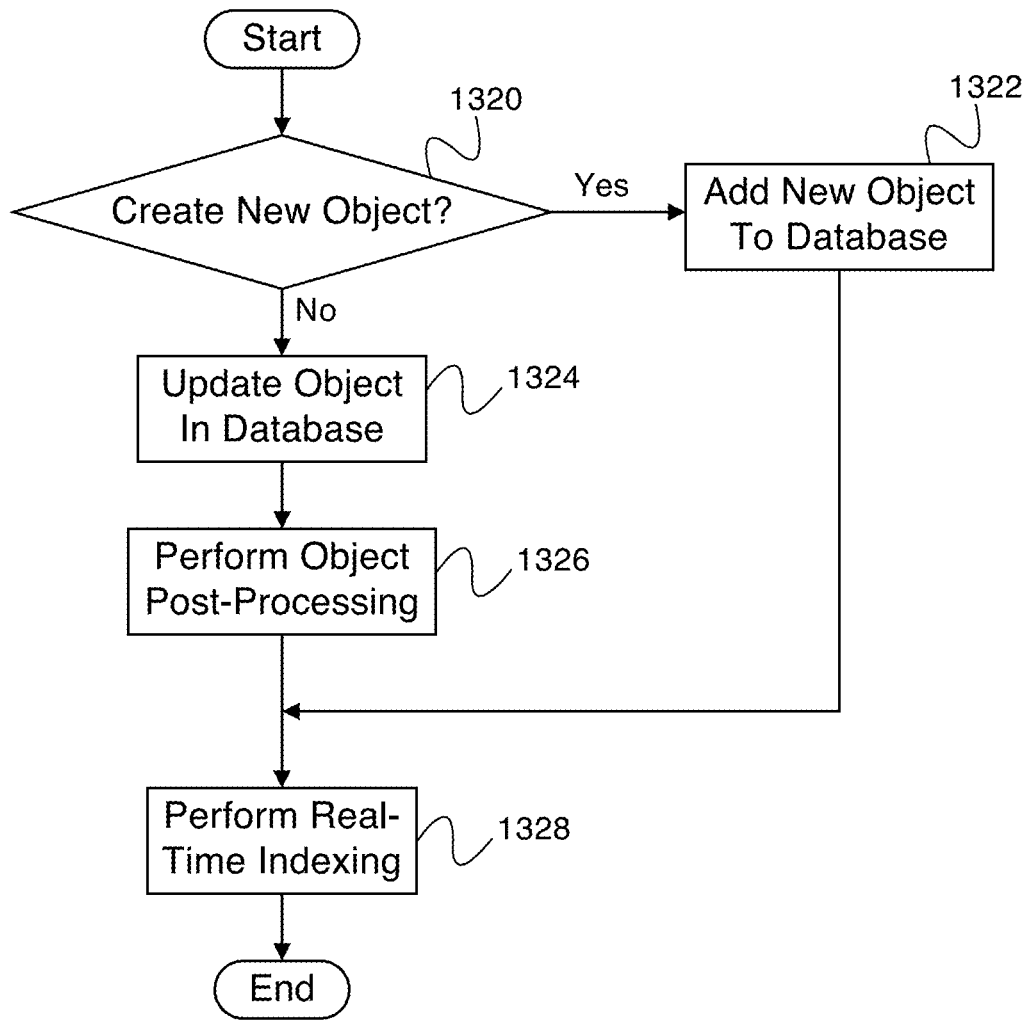
FIG. 13B is a flow diagram illustrating an embodiment of a process for indexing an image in an instance recognition module.

FIG. 13B is a flow diagram illustrating an embodiment of a process for indexing an image in an instance recognition module. In some embodiments, the process of FIG. 13B implements 1304 of FIG. 13A. In the example shown, in 1320, it is determined whether to create a new object. A new object should be created if the object represented in the image is not present in the object database. If it is determined in 1320 that a new object should be created, control passes to 1322. In 1322, a new object is added to the database. The new object added to the database corresponds to the object represented in the image being indexed. Control then passes to 1328. If it was determined in 1320 that a new object should not be created, control passes to 1324. In 1324, the object represented in the image being indexed is updated. In various embodiments, updating an object comprises adding an image to the set of images associated with the object, adding a tag to the set of tags associated with the object, modifying a tag associated with the object, or any other appropriate object updating operation. In 1326, object post-processing is performed. In various embodiments, object post-processing comprises background subtraction, image segmentation, retrieval of object metadata, normalization, or any other appropriate object post-processing operation. In some embodiments, object metadata is retrieved for objects of particularly high interest, e.g., objects that are searched for regularly. In some embodiments, object post-processing is automated and does not require human intervention. In various embodiments, object post-processing is performed manually by a human, either for all objects or only for those that meet certain criteria such as search frequency or value of the object as defined according to appropriate metrics. In 1328, real-time indexing is performed.

Figure 13C:
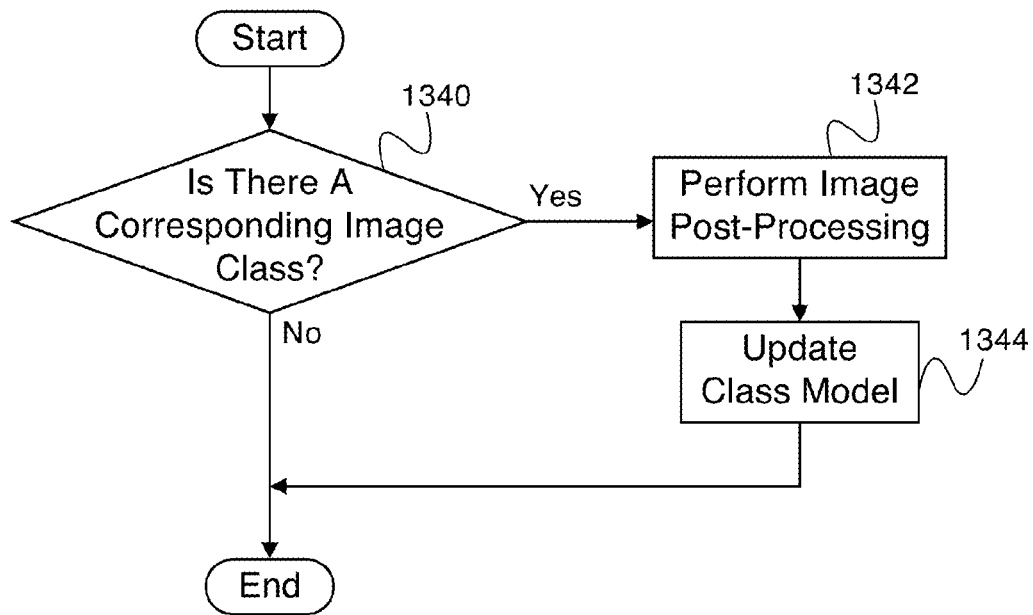
FIG. 13C is a flow diagram illustrating an embodiment of a process for indexing an image in a class recognition module.

FIG. 13C is a flow diagram illustrating an embodiment of a process for indexing an image in a class recognition module. In some embodiments, the process of FIG. 13C implements 1308 of FIG. 13A. In the example shown, in 1340, it is determined whether there is an indexed image class corresponding to the class determined for the image. In some embodiments, it is determined whether there is an indexed image class corresponding to the image by using the class recognition module to compare the image with mathematical representations of indexed visual classes. In some embodiments, it is determined whether there is an indexed image class corresponding to the image by comparing the indexed image classes with a previously determined image class for the image. If it is determined that there is no corresponding image class, the process ends. In some embodiments, a new object class with the new exemplar is created and added to the object database. If it is determined that there is a corresponding image class, control passes to 1342. In 1342, image post-processing is performed. In various embodiments, image post-processing comprises background subtraction, image segmentation, creation of a bounding box surrounding the object of interest in the image, normalization, or any other appropriate post-processing. In some embodiments, object post-processing is automated and does not require human intervention. In various embodiments, object post-processing is performed manually by a human, either for all objects or only for those that meet certain criteria such as search frequency or value of the object as defined according to appropriate metrics. In 1344, the class model is updated. Updating the class model comprises updating the class model used by the class recognition module to determine if an image is a member of the class with information from the current image.

Figure 13D:
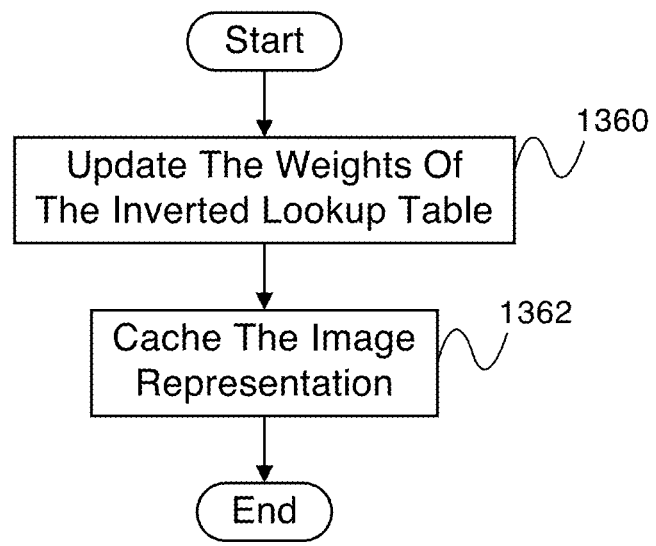
FIG. 13D is a flow diagram illustrating an embodiment of a process for performing real-time indexing.

FIG. 13D is a flow diagram illustrating an embodiment of a process for performing real-time indexing. In some embodiments, the process of FIG. 13D implements 1328 of FIG. 13B. In the example shown, in 1360, the weights of the inverted lookup table are updated. In some embodiments, the inverted lookup table comprises the inverted lookup table used by the instance recognition module to form a short list of matches (e.g., the inverted lookup table used in 702 of FIG. 7). In some embodiments, the weights of the feature description in the inverted lookup table are functions of the set of indexed images. In some embodiments, updating the weights of the inverted lookup table comprises updating any weights in the lookup table that are changed upon indexing a new image without recalculating the entire lookup table. In 1362, the image representation is cached. In some embodiments, caching the image representation comprises storing a local representation of the image that is used by the geometric validation process to determine whether there is a correspondence between the query image and the images in the short list of matches (e.g., the geometric validation process used in 504 of FIG. 5).

Figure 14A:
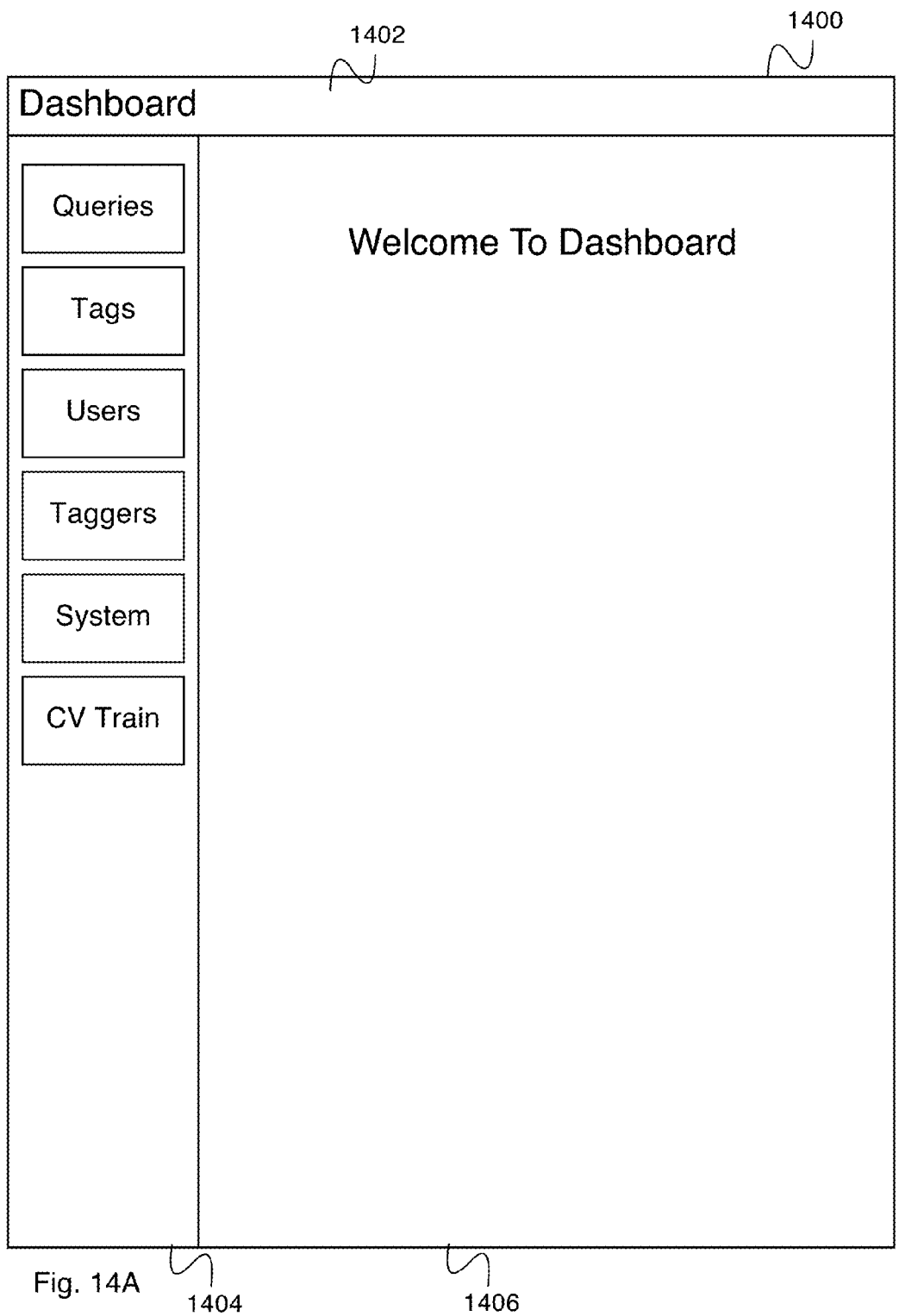
FIG. 14A is a diagram illustrating an embodiment of the welcome screen for a dashboard system.

FIG. 14A is a diagram illustrating an embodiment of the welcome screen for a dashboard system. In some embodiments, the dashboard system comprises dashboard 214 of FIG. 2. In the example shown, dashboard system 1400 comprises title bar 1402, function selector 1404, and main display 1406. Function selector 1404 comprises a set of buttons, each corresponding to a dashboard function. For example, the dashboard functions include queries, tags, users, taggers, system, CV train. Main display 1406 displays the user interface for the currently displayed dashboard function. In the example shown, no function is selected and main display 1406 simply displays a welcome message.

FIG. 14B is a diagram illustrating an embodiment of a query monitoring screen for a dashboard system. In some embodiments, dashboard system 1410 comprises dashboard system 1400 of FIG. 14A. In the example shown, the query function is selected in the function selector. The main display shows three columns, comprising column 1412, labeled "Query Info," column 1414, labeled "Image," and column 1416, labeled "Results". Column 1412 displays information related to recent image queries. In the example shown, the query date, query time, query processing time, and query user ID are shown for each query in column 1412. Column 1414 displays each query image. Column 1416 displays the results for each image query. In the example shown, column 1416 displays results determined by the instance recognition module (e.g., results determined in 400 of FIG. 4A), results determined by the class recognition module (e.g., results determined in 402 of FIG. 4A), results determined by the human computation module (e.g., results determined in 306 of FIG. 3), and the final result (e.g., the final result determined in 308 of FIG. 3). In some embodiments, further information about a query can be accessed by clicking on the display row corresponding to the query. In various embodiments, further information about a query comprises a zoomed-in image view, location where the image was taken, location of the query user, results determined by the barcode recognition module (e.g., results determined in 424 of FIG. 4B), results determined by the optical character recognition module (e.g., results determined in 420 of FIG. 4B), results determined by the face identification module (e.g., results determined in 422 of FIG. 4B), results determined by the color detection module (e.g., results determined in 426 of FIG. 4B), or any other appropriate image query information.

Figure 14C:
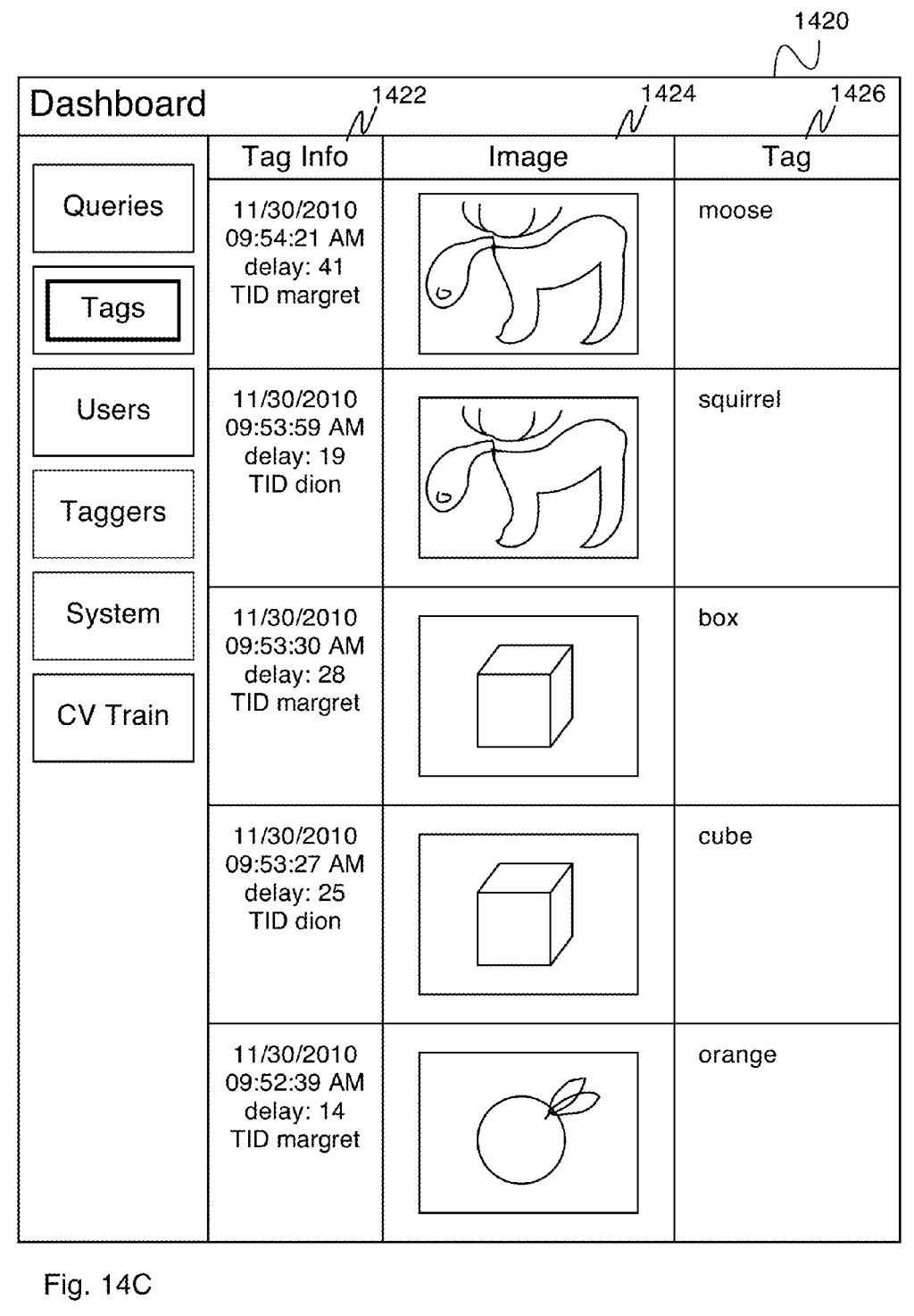

FIG. 14C is a diagram illustrating an embodiment of a tag monitoring screen for a dashboard system. In some embodiments, dashboard system 1420 comprises dashboard system 1400 of FIG. 14A. In the example shown, the tags function is selected in the function selector. The main display shows three columns, comprising column 1422, labeled "Tag Info," column 1424, labeled "Image," and column 1426, labeled "Tag". Column 1422 displays information related to recent image tags. In the example shown, the tag date, the tag time, the delay time for the tag, and the tagger ID are displayed for each tag in column 1422. Column 1424 displays the image associated with each tag. Column 1426 displays the tag assigned to the image. In the second row, the tag info includes date Nov. 30, 2010, time 9:53:59 AM, delay 19 (e.g., time in seconds from submission of image query to identification of tag), TID dion, and an image of a moose and a tag ID of squirrel.

FIG. 14D is a diagram illustrating an embodiment of a user management screen for a dashboard system. In some embodiments, dashboard system 1430 comprises dashboard system 1400 of FIG. 14A. In the example shown, the users function is selected in the function selector. The main display shows three columns, comprising column 1432, labeled "UID," column 1434, labeled "Active?," and column 1436, labeled "#Queries". In the example shown, the user ID for each user is shown in column 1432. Column 1434 shows whether a user is currently active. The number of queries for the user is shown in column 1436. In some embodiments, further information about a user can be accessed by clicking on the display row corresponding to the user. In various embodiments, further information about a user comprises user name, user secret code, user profile type, user company or industry association user unlimited queries status, user parent, user version, user join batch, user join date, user queries purchased, or any other appropriate further information about a user.

FIG. 14E is a diagram illustrating an embodiment of a tagger management screen for a dashboard system. In some embodiments, dashboard system 1440 comprises dashboard system 1400 of FIG. 14A. In the example shown, the taggers function is selected in the function selector. The main display shows three columns, comprising column 1442, labeled "TID," column 1444, labeled "Active?," and column 1446, labeled "#Tags". In the example shown, the tagger ID for each tagger is shown in column 1442. Column 1444 shows whether a tagger is currently active. The number of tags for the tagger is shown in column 1446. In some embodiments, further information about a tagger can be accessed by clicking on the display row corresponding to the tagger. In various embodiments, further information about a tagger comprises tagger email, tagger unpaid earnings, tagger paid earnings, tagger automatic status, tagger manual status, tagger official status, statistical graphs on performance, and any other appropriate information about a tagger.

Figure 14F:
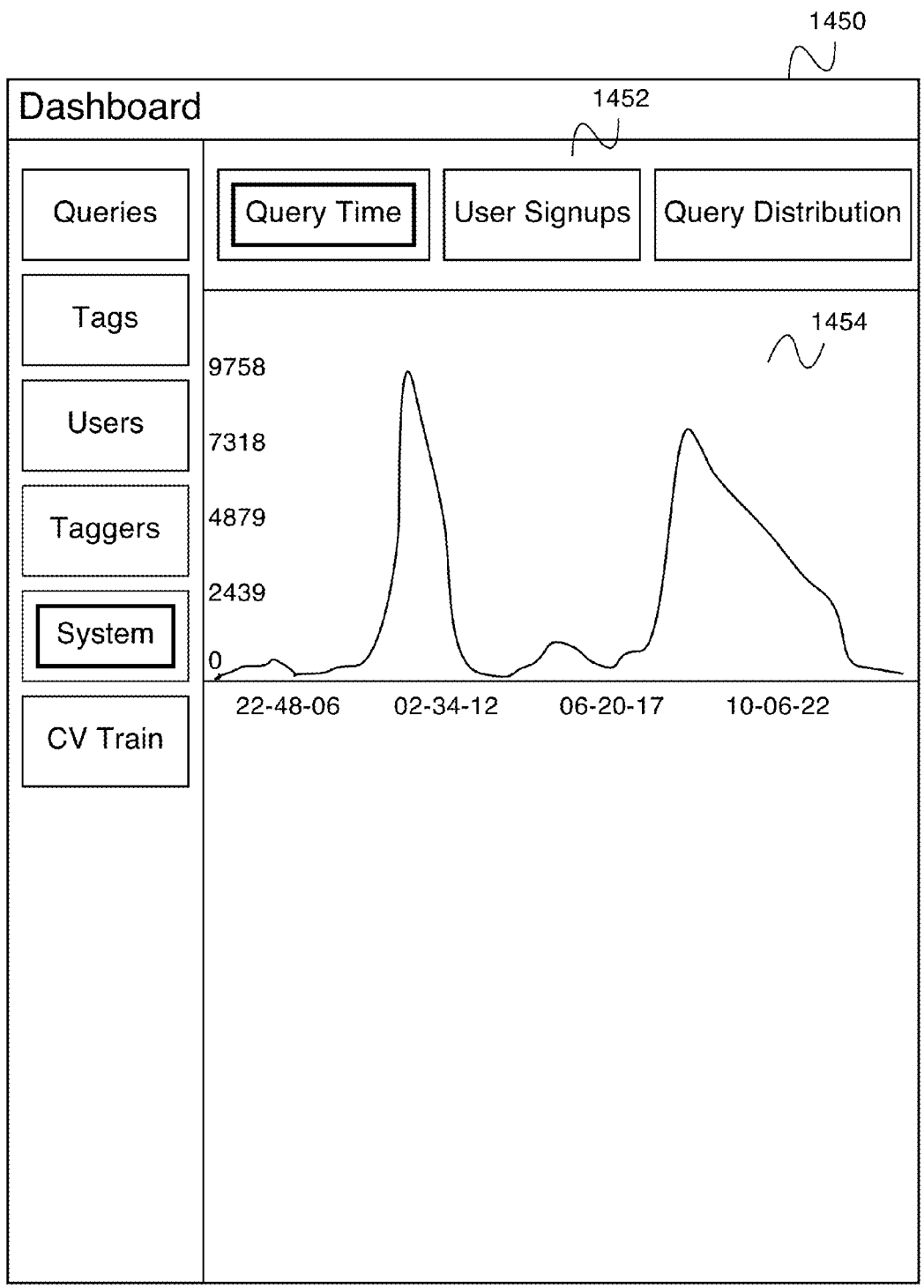
FIG. 14F is a diagram illustrating an embodiment of a system management screen for a dashboard system.

FIG. 14F is a diagram illustrating an embodiment of a system management screen for a dashboard system. In some embodiments, dashboard system 1450 comprises dashboard system 1400 of FIG. 14A. In the example shown, the system function is selected in the function selector. The main display shows system function selector 1452 and system data display 1454. In the example shown, system function selector 1452 allows a dashboard user to select from a query time display, a user signups display, and a query distribution display. In some embodiments, other system function display options are available. When the query time system function is selected, system data display 1454 displays system data related to query time. When the user signups system function is selected, system data display 1454 displays system data related to user signups. When the query distribution system function is selected, system data display 1454 displays system data related to query distribution.

Figure 14G:
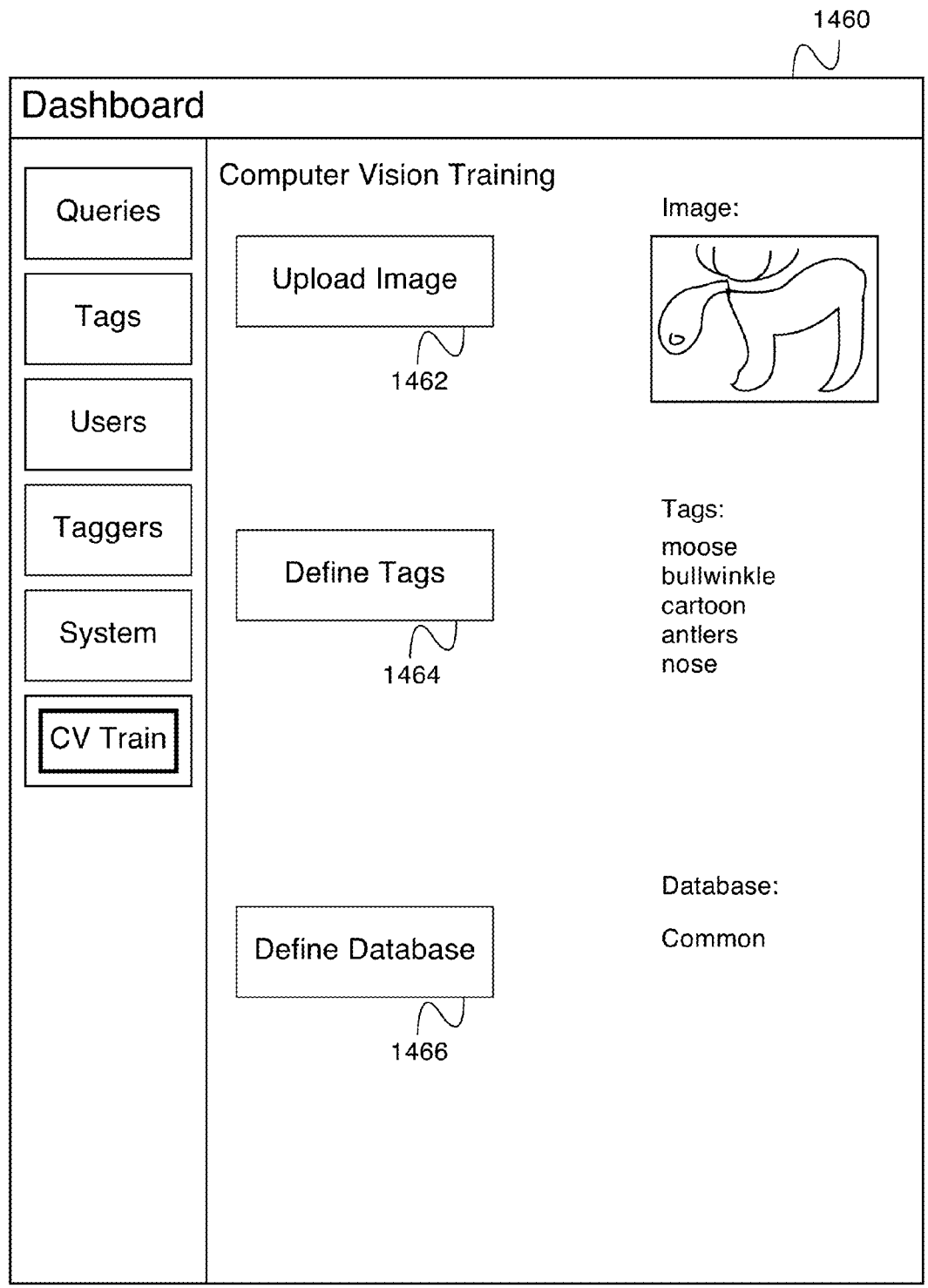
FIG. 14G is a diagram illustrating an embodiment of a computer vision training screen for a dashboard system.

FIG. 14G is a diagram illustrating an embodiment of a computer vision training screen for a dashboard system. In some embodiments, dashboard system 1460 comprises dashboard system 1400 of FIG. 14A. In the example shown, the CV train function is selected in the function selector. The main display shows upload image button 1462, define tags button 1464, and define database button 1466. The computer vision training screen is used by a system administrator to manually add images and tags to the image database. Upload image button 1462 is used to add an image to the database. Define tags button 1464 is uses to add tags associated with the image to the database. Define database button 1466 is used to select the image database to add the image and associated tags to.

Figure 15:
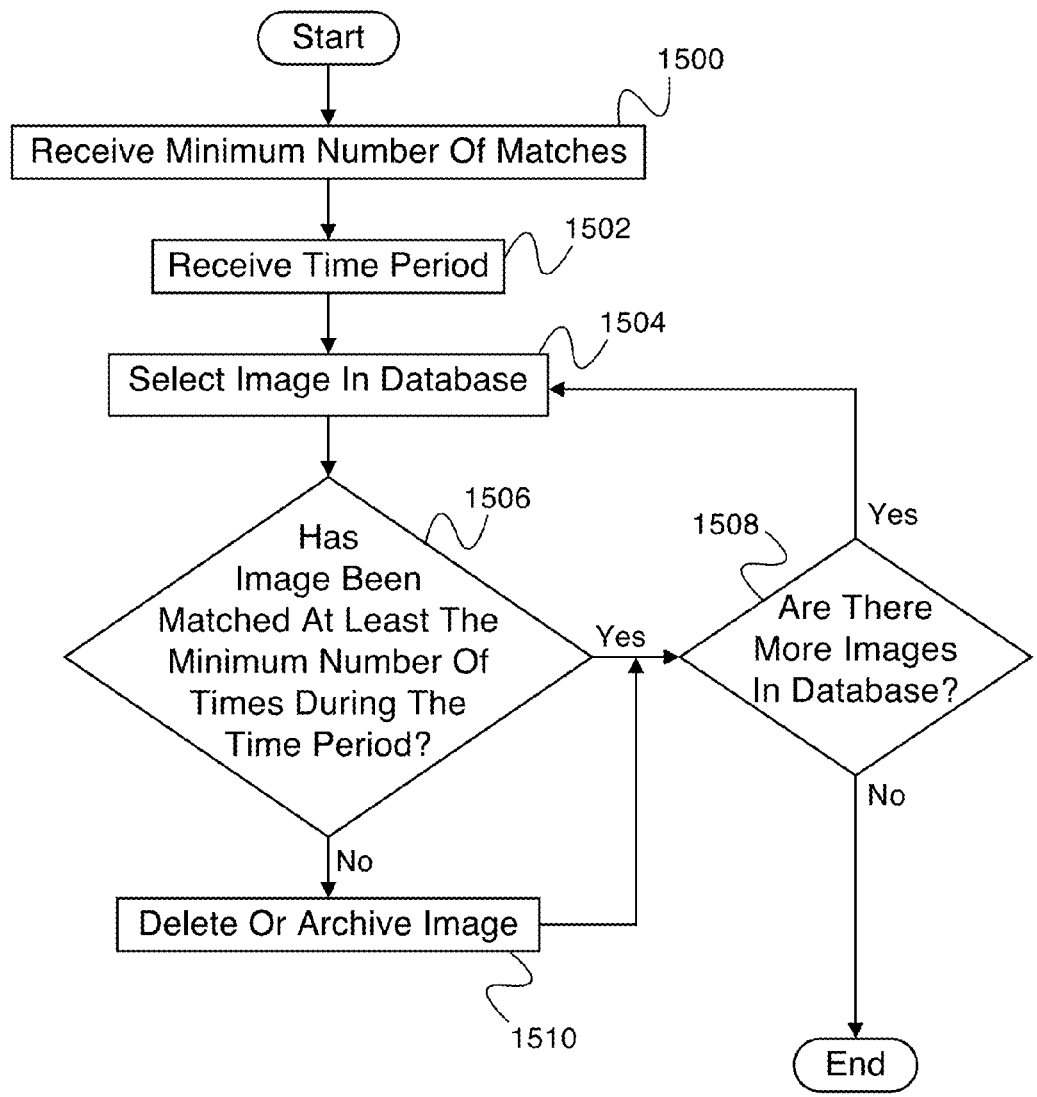
FIG. 15 is a flow diagram illustrating an embodiment of a process for garbage collection.

FIG. 15 is a flow diagram illustrating an embodiment of a process for garbage collection. In some embodiments, the process of FIG. 15 is executed by 216 of FIG. 2. In the example shown, in 1500, a minimum number of matches is received. In various embodiments, the minimum number of matches is 1, 2, 5, 12, 122, or any other appropriate number. In 1502, a time period is received. In various embodiments, the time period is 1 day, 1 week, 1 year, or any other appropriate time period. In 1504, an image is selected in the database. In various embodiments, an image is selected randomly, according to an ordered list, according to a hashing algorithm, or by any other appropriate means. In 1506, it is determined if the image has been matched at least the minimum number of times during the time period. In some embodiments, the object database (e.g., object databases 208 of FIG. 2) store images along with an access log in order to facilitate determining the number of times the image has been matched during the time period. If the image has been matched at least the minimum number of times during the time period, control passes to 1508. In 1508, it is determined whether there are more images in the database to select. If there are more images in the database to select, control passes to 1504, and the process repeats. If there are no more images in the database to select, the process ends. If it is determined in 1506 that the image has not been matched at least the minimum number of times during the time period, control passes to 1510. In 1510, the image is deleted or archived. Control then passes to 1508. In some embodiments, archiving an image comprises moving it to a database with a lower quality of service than the primary database.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
    a processor; and
    a memory, at least one of the processor or the memory being configured to:
        analyze an image associated with an image query using one or more computer vision analysis types to determine computer vision matches, wherein each computer vision match includes one or more computer vision tags associated with the image;

determine whether any computer vision matches for the analyzed image have been determined;

in the event that one or more computer vision matches have been determined, add the image associated with the image query to one or more databases and for each of the one or more computer vision matches associating the image with the one or more associated computer vision tags; and in the event that there are no computer vision matches or the computer vision matches are determined to be inadequate, analyze the image associated with the image query using a human vision analysis system to determine one or more human vision matches, wherein each human vision match includes one or more human vision tags associated with the image;

wherein a computer vision match is determined to be inadequate when the computer vision match lacks specificity or a probability associated with the computer vision match indicates that the computer vision match is not a strong match.

2. The system as recited in claim 1, at least one of the processor or the memory being further configured to receive the image query.

3. The system as recited in claim 1, at least one of the processor or the memory being further configured to determine one or more computer vision analysis types for the image query.

4. The system as recited in claim 1, at least one of the processor or the memory being further configured to: in the event that there are no human vision matches, indicate that there are no matches identified.

5. The system as recited in claim 1, at least one of the processor or the memory being further configured to select from the one or more associated computer vision tags or the one or more associated human vision tags, one or more tag results for the image query.

6. The system as recited in claim 5, at least one of the processor or the memory being further configured to provide the one or more tag results.

7. The system as recited in claim 1, at least one of the processor or the memory being further configured to, in the event that there are one or more human vision matches, add the image associated with the image query to one or more databases and for each of the one or more human vision matches associating the image with the one or more human vision tags.

8. The system as recited in claim 1, wherein the human vision analysis system is configured to verify the computer vision tags associated with each of the computer vision matches.

9. The system as recited in claim 8, at least one of the processor or the memory being further configured to provide at least one of the human vision tags.

10. The system as recited in claim 9, wherein the at least one of the human vision tags comprises a set of verified computer vision tags, the set of verified computer vision tags comprising at least one of the computer vision tags.

11. The system as recited in claim 1, wherein the human vision analysis system is configured to communicate with one or more human taggers.

12. The system as recited in claim 11, wherein the human taggers comprise expert human taggers.

13. The system as recited in claim 11, further comprising: a dashboard system configured to provide information pertaining to each of the human taggers, wherein the information indicates a performance of the corresponding one of the human taggers.

14. The system as recited in claim 11, at least one of the processor or the memory being further configured to: provide the image and the human vision tags to the human taggers.

15. The system as recited in claim 11, at least one of the processor or the memory being further configured to: assign a tagger status to one of the human taggers based upon a validity of human vision tags submitted by the corresponding one of the human taggers.

16. The system as recited in claim 11, at least one of the processor or the memory being further configured to: provide a user interface to the human taggers, the user interface including a tagging guideline that includes one or more tag entry boxes and corresponding indicators specifying specific information requested for the image.

17. A method for tagging an image, comprising:
analyzing an image associated with an image query using one or more computer vision analysis types to determine computer vision matches, wherein each computer vision match has one or more associated computer vision tags;

determining whether any computer vision matches for the analyzed image have been determined;

in the event that one or more computer vision matches have been determined, add the image associated with the image query to one or more databases and for each of the one or more computer vision matches associating the image with the one or more associated computer vision tags; and in the event that there are no computer vision matches or the computer vision matches are determined to be inadequate, analyze the image associated with the image query using a human vision analysis system to determine one or more human vision matches, wherein each human vision match includes one or more human vision tags associated with the image.

18. A non-transitory computer-readable storage medium storing thereon computer-readable instructions, comprising:
instructions for analyzing an image associated with an image query using one or more computer vision analysis types to determine computer vision matches, wherein each computer vision match has one or more associated computer vision tags;

instructions for determining whether any computer vision matches for the analyzed image have been determined;

instructions for, in the event that one or more computer vision matches are determined, adding the image associated with the image query to one or more databases and for each of the one or more computer vision matches associating the image with the one or more associated computer vision tags; and instructions for, in the event that there are no computer vision matches or the computer vision matches are determined to be inadequate, analyzing the image associated with the image query using a human vision analysis system based on the context information to determine one or more human vision matches, wherein each human vision match includes one or more human vision tags associated with the image;

wherein a computer vision match is determined to be inadequate when the computer vision match lacks specificity or a probability associated with the computer vision match indicates that the computer vision match is not a strong match.

19. The non-transitory computer-readable storage medium as recited in claim 18, further comprising:
instructions for determining whether the computer vision matches are specific enough, wherein determining whether the computer vision matches are specific enough is performed based, at least in part, on context information, wherein the context information comprises one or more of the following: information from an originating web site, information from an originating web service, associated text information, a specific user request, a specific request from a site submitting the image, metadata information from a service, information about a user submitting the image query, or geolocation.

20. The non-transitory computer-readable storage medium as in claim 18, further comprising instructions for determining one or more computer vision analysis types for the image query.

21. The non-transitory computer-readable storage medium as recited in claim 18, further comprising instructions for selecting from the one or more associated computer vision tags or the one or more associated human vision tags, one or more tag results for the image query.

22. The non-transitory computer-readable storage medium as recited in claim 21, further comprising instructions for providing the one or more tag results.

23. The non-transitory computer-readable storage medium as recited in claim 18, further comprising instructions for, in the event that there are one or more human vision matches, adding the image associated with the image query to one or more databases and for each of the one or more human vision matches associating the image with the one or more associated human vision tags.

24. A method, comprising:

analyzing an image associated with an image query using one or more computer vision analysis types to determine one or more computer vision matches, wherein each computer vision match has one or more associated computer vision tags;

determining, based at least in part on context information, whether the computer vision matches for the analyzed image are sufficiently specific; and in the event that the computer vision matches are determined to lack specificity based at least in part on the context information, analyze the image associated with the image query using a human vision analysis system based on the context information to determine one or more human vision matches, wherein each human vision match includes one or more human vision tags associated with the image, wherein the human vision analysis system is configured to communicate with one or more human taggers, wherein a user interface is provided to the human taggers, the user interface including a tagging guideline that includes one or more tag entry boxes and corresponding indicators specifying specific information requested for the image.

* * * * *